(12) United States Patent
Park et al.

(10) Patent No.: US 12,022,255 B2
(45) Date of Patent: Jun. 25, 2024

(54) ELECTRONIC DEVICE INCLUDING SPEAKER MODULE

(71) Applicant: SAMSUNG ELECTRONICS CO., LTD., Suwon-si (KR)

(72) Inventors: Choonghyo Park, Suwon-si (KR); Kiwon Kim, Suwon-si (KR); Myoungsung Sim, Suwon-si (KR); Changshik Yoon, Suwon-si (KR); Woojin Cho, Suwon-si (KR); Joonrae Cho, Suwon-si (KR); Hyunggwang Kang, Suwon-si (KR); Byounghee Lee, Suwon-si (KR); Sangsoo Park, Suwon-si (KR); Hochul Hwang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 79 days.

(21) Appl. No.: 17/519,753

(22) Filed: Nov. 5, 2021

(65) Prior Publication Data

US 2022/0150619 A1 May 12, 2022

Related U.S. Application Data

(63) Continuation of application No. PCT/KR2021/015641, filed on Nov. 2, 2021.

(30) Foreign Application Priority Data

Nov. 6, 2020 (KR) .................. 10-2020-0147826
Dec. 3, 2020 (KR) .................. 10-2020-0167709

(51) Int. Cl.
*H04R 1/28* (2006.01)
*G09F 9/30* (2006.01)
*H04M 1/02* (2006.01)

(52) U.S. Cl.
CPC ........... *H04R 1/2826* (2013.01); *G09F 9/301* (2013.01); *H04M 1/0268* (2013.01);
(Continued)

(58) Field of Classification Search
CPC ...... H04R 1/2826; H04R 1/2834; H04R 1/02; H04R 1/28; H04R 1/028; H04R 1/2823;
(Continued)

(56) References Cited

U.S. PATENT DOCUMENTS 6,292,563 B1 * 9/2001 Clark .................. H04M 1/0216
379/433.13
10,887,683 B1 * 1/2021 Choi ..................... H04R 1/028
(Continued)

FOREIGN PATENT DOCUMENTS

CN 106792336 A * 5/2017 ............... H04R 1/20
CN 113596672 A * 11/2021 ............... H04M 1/03
(Continued)

OTHER PUBLICATIONS

International Search Report and Written Opinion dated Feb. 9, 2022 in corresponding International Application No. PCT/KR2021/015641.
(Continued)

*Primary Examiner* — Ahmad F. Matar
*Assistant Examiner* — Sabrina Diaz
(74) *Attorney, Agent, or Firm* — NIXON & VANDERHYE P.C.

(57) ABSTRACT

According to various embodiments of the disclosure, an electronic device may include: a first housing, a second housing accommodating at least a portion of the first housing and configured to guide sliding movement of the first housing, a flexible display including a first display area disposed on the first housing and a second display area extending from the first display area, a speaker module
(Continued)

including a speaker unit including at least one speaker disposed in the second housing and a speaker enclosure accommodating the speaker unit and including a vent hole, and a seal connected to the first housing and the speaker enclosure and configured to be variable based on the sliding movement of the first housing.

15 Claims, 19 Drawing Sheets

(52) U.S. Cl.
CPC ....... *H04R 1/2834* (2013.01); *H04R 2400/03* (2013.01); *H04R 2499/11* (2013.01)

(58) Field of Classification Search
CPC .. H04R 1/2811; H04R 1/2846; H04R 1/2849; H04R 2400/03; H04R 2499/11; H04R 2499/15; G09F 9/301; G09F 9/3023; H04M 1/0268
USPC ........ 381/338, 345, 350, 386, 388, 395, 411
See application file for complete search history.

(56) References Cited

U.S. PATENT DOCUMENTS

| | | |
|---|---|---|
| 2006/0240881 A1 | 10/2006 | Cho et al. |
| 2008/0151510 A1 | 6/2008 | Cho et al. |
| 2008/0268793 A1 | 10/2008 | Nelson et al. |
| 2013/0301205 A1 | 11/2013 | Fyke |
| 2014/0066140 A1 | 3/2014 | Baek |
| 2014/0139883 A1 | 5/2014 | Hashizume |
| 2014/0194165 A1 | 7/2014 | Hwang |
| 2017/0055069 A1 | 2/2017 | Lee et al. |
| 2018/0014417 A1 | 1/2018 | Seo et al. |
| 2018/0109659 A1 | 4/2018 | Zhao et al. |
| 2018/0279029 A1 | 9/2018 | Saini et al. |
| 2019/0310686 A1 | 10/2019 | Lee et al. |
| 2020/0084527 A1 | 3/2020 | Walter et al. |
| 2020/0266845 A1 | 8/2020 | Kumar et al. |
| 2020/0329132 A1 | 10/2020 | Jung et al. |
| 2020/0341517 A1 | 10/2020 | Yang et al. |

FOREIGN PATENT DOCUMENTS

| | | | | |
|---|---|---|---|---|
| KR | 10-2006-0112300 | 10/2006 | | |
| KR | 10-2010-0062078 | 6/2010 | | |
| KR | 10-2014-0051720 | 5/2014 | | |
| KR | 10-2014-0063448 | 5/2014 | | |
| KR | 10-2015-0136256 | 12/2015 | | |
| KR | 10-2016-0011466 | 2/2016 | | |
| KR | 2016011466 A | * 2/2016 | ............... H04B 1/38 |
| KR | 10-2017-0021562 | 2/2017 | | |
| KR | 10-2018-0006533 | 1/2018 | | |
| KR | 10-2021-0143419 | 11/2021 | | |

OTHER PUBLICATIONS

Extended European Search Report dated Dec. 6, 2023 for EP Application No. 21889499.6.

* cited by examiner

ELECTRONIC DEVICE INCLUDING SPEAKER MODULE

CROSS-REFERENCE TO RELATED APPLICATIONS

This application is a continuation of International Application No. PCT/KR2021/015641 designating the United States, filed on Nov. 2, 2021, in the Korean Intellectual Property Receiving Office and claiming priority to Korean Patent Application No. 10-2020-0147826, filed on Nov. 6, 2020, in the Korean Intellectual Property Office and Korean Patent Application No. 10-2020-0167709, filed on Dec. 3, 2020, in the Korean Intellectual Property Office, the disclosures of all of which are incorporated by reference herein in their entireties.

BACKGROUND

Field

The disclosure relates to an electronic device including a speaker module.

Description of Related Art

In line with the development of information and communication technology and semiconductor technology, various functions are being integrated into one portable electronic device. For example, an electronic device may implement an entertainment function such as a game, a multimedia function such as music/video playback, a communication and security function for mobile banking, and a schedule management and electronic wallet function, as well as a communication function. This electronic device is being miniaturized in order for users to conveniently carry the same.

As the mobile communication service extends to the multimedia service area, there is a need to increase the size of a display of the electronic device in order for the user to fully use multimedia services as well as voice calls or short messages. However, the size of the display of the electronic device has a trade-off relationship with the miniaturization of the electronic device.

An electronic device (e.g., a portable terminal) includes a display having a flat surface, or a flat surface and a curved surface. An electronic device including a display may have a limitation in realizing a screen larger than the size of the electronic device due to the structure of the fixed display. Accordingly, research on an electronic device including a foldable or rollable display is under way.

An electronic device including a rollable display may have an increased length or volume thereof in an opened state. For example, an empty space may be formed in the electronic device in an opened state.

SUMMARY

Embodiments of the disclosure provide an electronic device in which an empty space formed in the electronic device in an opened state is used as a resonance space of a speaker.

Embodiments of the disclosure provide a reflex port whose length varies based on the state of an electronic device.

Embodiments of the disclosure provide an electronic device that adjusts a signal generated by a speaker unit, based on the size of a resonance space of an electronic device.

Technical Solution

According to various example embodiments of the disclosure, an electronic device may include: a first housing, a second housing configured to accommodate at least a portion of the first housing and to guide sliding movement of the first housing, a flexible display including a first display area disposed on the first housing and a second display area extending from the first display area, a speaker module including a speaker unit including at least one speaker disposed in the second housing, a speaker enclosure accommodating the speaker unit and including a vent hole, and a seal connected to the first housing and the speaker enclosure and configured to be variable based on the sliding movement of the first housing.

According to various example embodiments of the disclosure, an electronic device may include: a first housing, a second housing configured to accommodate at least a portion of the first housing and to guide sliding movement of the first housing, a flexible display including a first display area disposed on the first housing and a second display area extending from the first display area, a speaker module including a speaker unit including at least one speaker disposed in the second housing, a first speaker enclosure disposed inside the first housing, and a second speaker enclosure disposed inside the second housing and including a speaker enclosure accommodating the speaker unit, and a seal connected to the first speaker enclosure and the second speaker enclosure.

Advantageous Effects

An electronic device according to various example embodiments of the disclosure can improve speaker performance using an empty space formed in an opened state as a resonance space.

An electronic device according to various example embodiments of the disclosure may improve a low-pitched sound using a reflex port whose length varies based on the state of the electronic device.

An electronic device according to various example embodiments of the disclosure may improve sound quality by adjusting a sound generated by a speaker module, based on the size of a resonance space.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
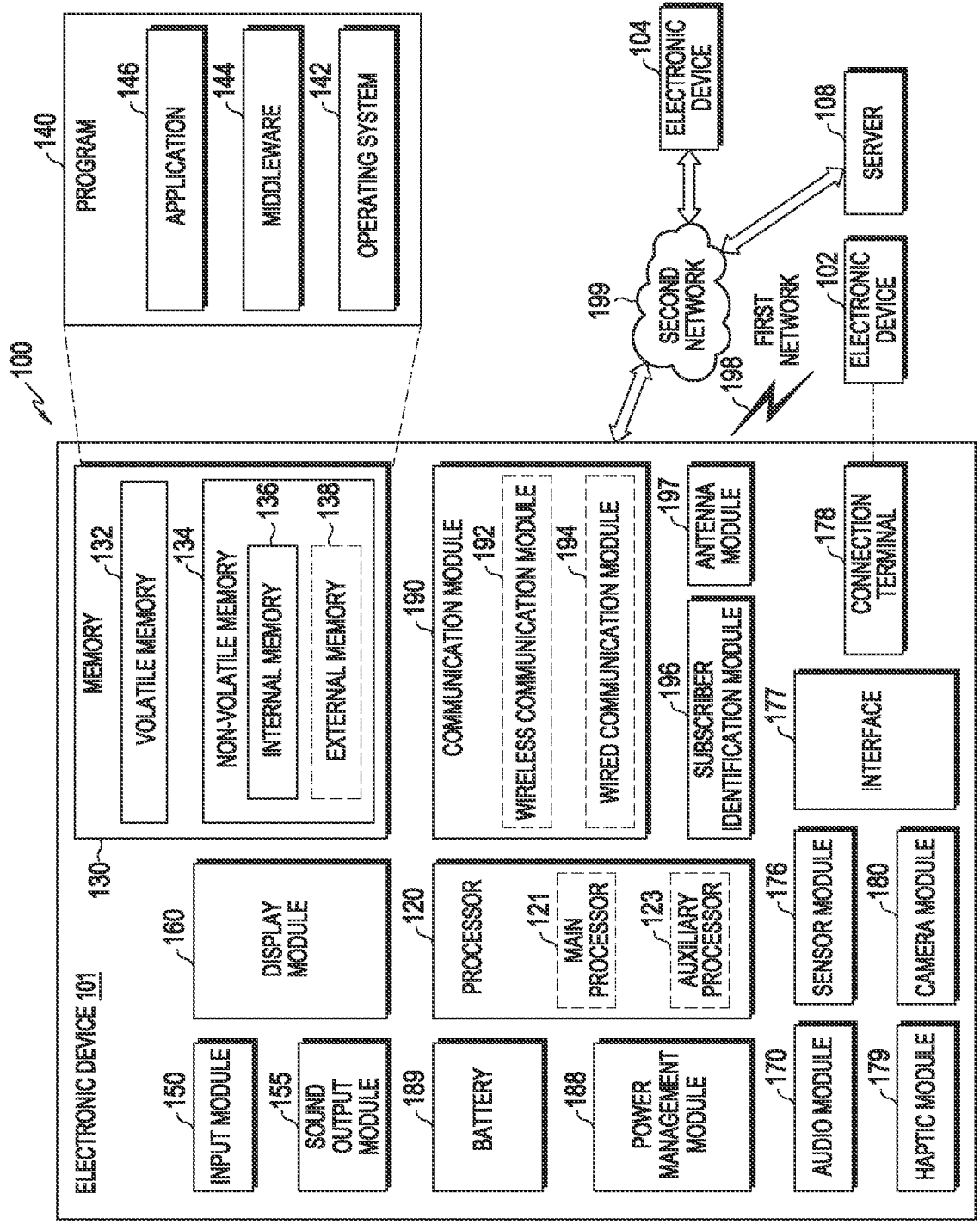
FIG. 1 is a block diagram of illustrating an example electronic device in a network environment according to various embodiments.

FIG. 1 is a block diagram illustrating an example electronic device 101 in a network environment 100 according to various embodiments.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active (e.g., executing an application) state. According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or an external electronic device (e.g., an electronic device 102 (e.g., a speaker or a headphone)) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™ wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, a a home appliance, or the like. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

According to various embodiments, each component (e.g., a module or a program) of the above-described components may include a single entity or multiple entities, and some of the multiple entities may be separately disposed in different components. According to various embodiments, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
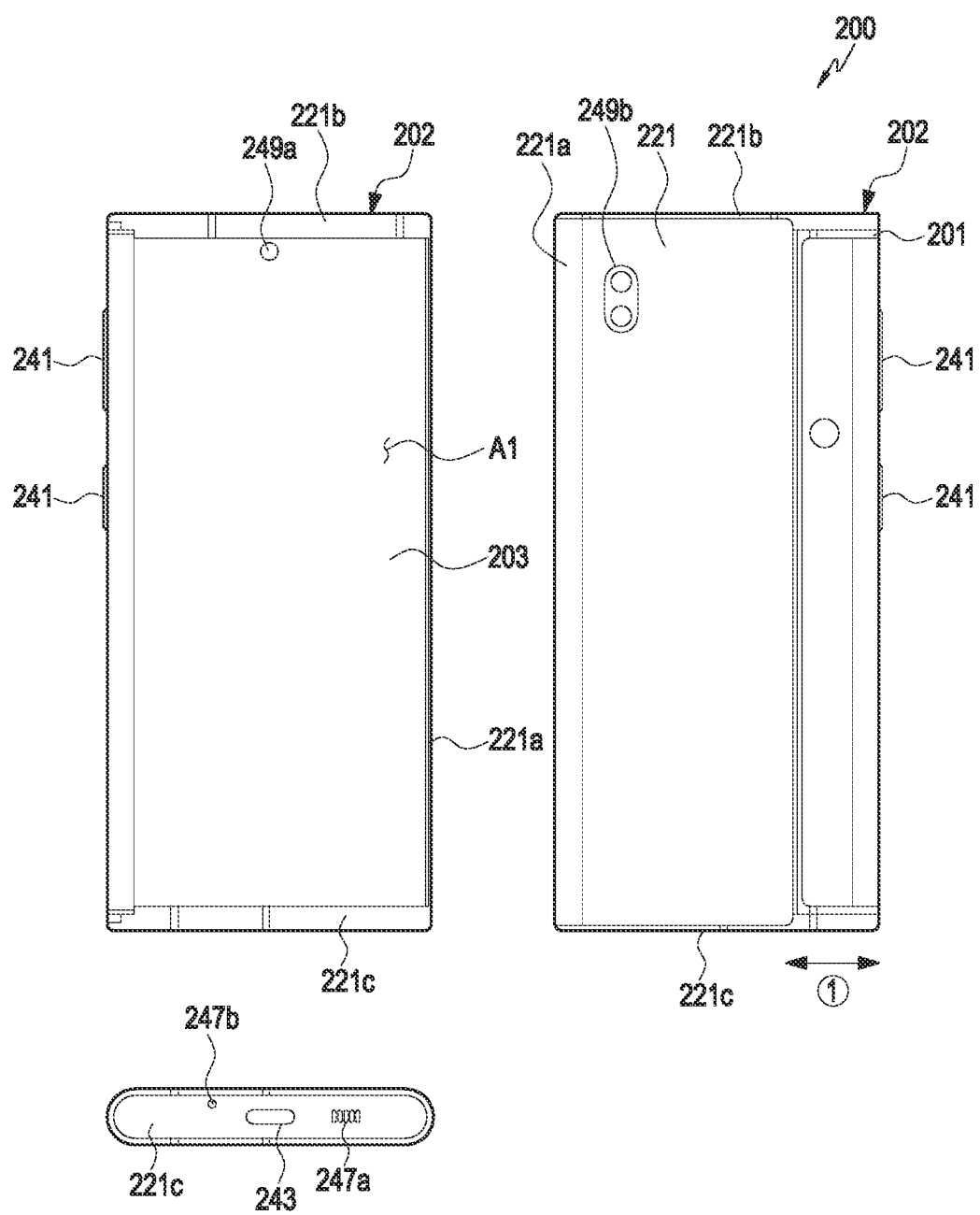
FIG. 2 is a diagram illustrating the state in which a second display area of a flexible display is received inside a second housing according to various embodiments.
Figure 3:
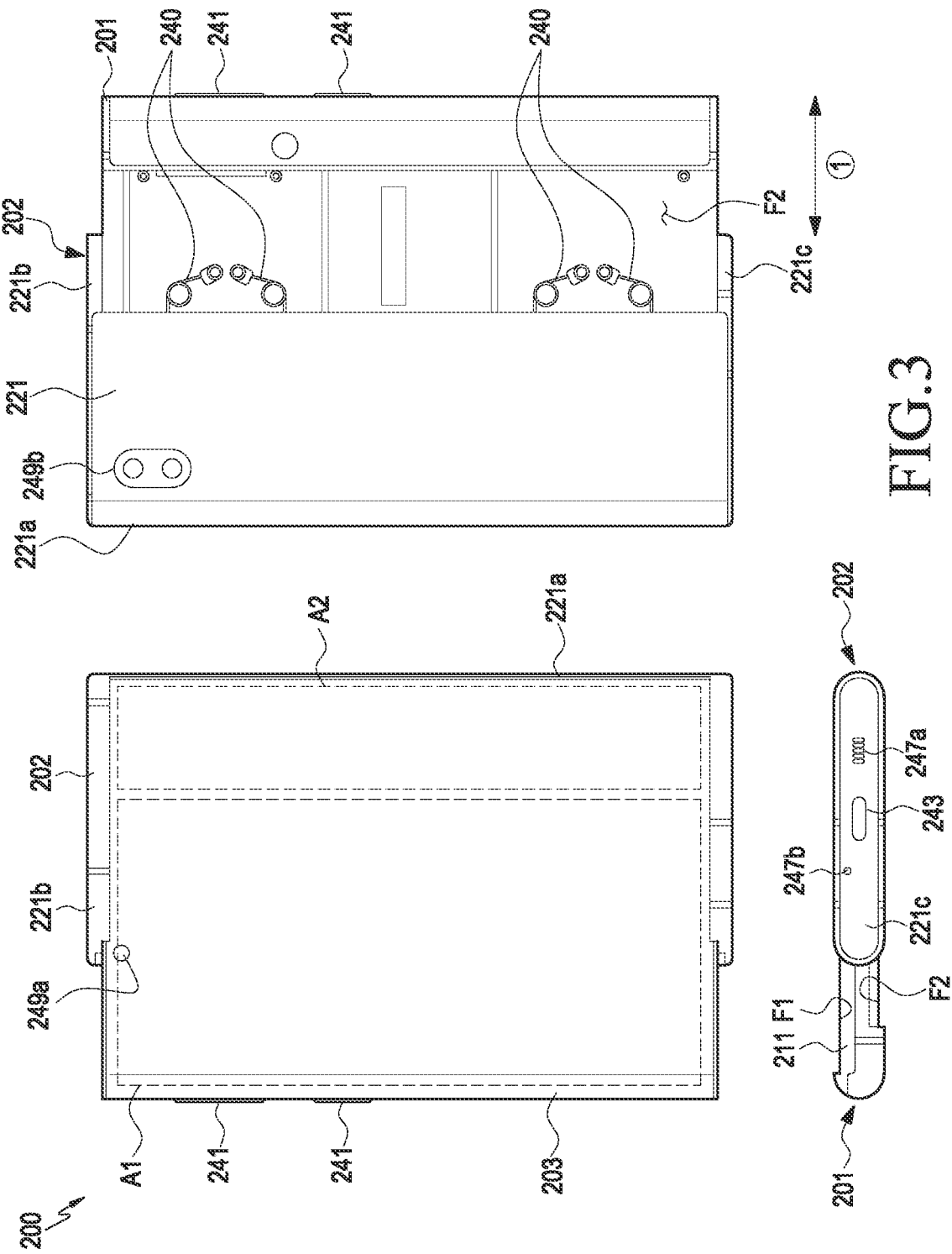
FIG. 3 is a diagram illustrating the state in which a second display area of a flexible display is exposed to the outside of a second housing according to various embodiments.

FIG. 2 is a diagram illustrating the state in which a second display area of a flexible display is received inside a second housing according to various embodiments. FIG. 3 is a diagram illustrating the state in which a second display area of a flexible display is exposed to the outside of a second housing according to various embodiments.

The state shown in FIG. 2 may be referred to as the state in which a first housing 201 is closed with respect to a second housing 202, and the state shown in FIG. 3 may be referred to as the state in which the first housing 201 is open with respect to the second housing 202. According to an embodiment, a "closed state" or an "opened state" may be referred to as the state in which the electronic device is closed or opened.

Referring to FIGS. 2 and 3, an electronic device 200 may include housings 201 and 202. The housings 201 and 202 may include a second housing 202 and a first housing 201 disposed to be movable relative to the second housing 202. In various embodiments, it may be construed as the structure in which the second housing 202 is disposed to slide on the first housing 201 in the electronic device 200. According to an embodiment, the first housing 201 may be disposed to be able to reciprocate by a certain distance in the illustrated direction, for example, the direction indicated by an arrow ①, with respect to the second housing 202. The configuration of the electronic device 200 in FIGS. 2 and 3 may be entirely or partly the same as the configuration of the electronic device 101 in FIG. 1.

According to various embodiments, the first housing 201 may be referred as, for example, a first structure, a sliding portion, or a sliding housing, and may be disposed to reciprocate on the second housing 202. According to an embodiment, the first housing 201 may accommodate various electric and electronic components such as a main circuit board or a battery. According to an embodiment, the second housing 202 may be referred to as, for example, a second structure, a main portion, or a main housing. A portion (e.g., a first display area A1) of the display 203 may be seated on the first housing 201. According to an embodiment, another portion (e.g., a second display area A2) of the display 203 may be received inside the second housing 202 (e.g., a slide-in operation), or may be exposed to the outside of the second housing 202 (e.g., a slide-out operation) according to the movement (e.g., sliding movement) of the first housing 201 relative to the second housing 202.

According to various embodiments, the first housing 201 may include a first plate 211 (e.g., a slide plate). The first plate 211 may include a first face (e.g., the first face F1 in FIG. 4) that forms at least a portion of the first plate 211, and a second face F2 that faces the opposite direction of the first face F1. According to an embodiment, the first plate 211 may support at least a portion (e.g., the first display area A1) of the display 203.

According to various embodiments, the second housing 202 may include a second plate (e.g., the second plate 221 in FIG. 4 or a main case), a first side wall 221a extending from the second plate 221, a second side wall 221b extending from the first side wall 221a and the second plate 221, and a third side wall 221c extending from the first side wall 221a and the second plate 221 to be parallel to the second side wall 221b. According to an embodiment, the second side wall 221b and the third side wall 221c may be formed perpendicular to the first side wall 221a. According to an embodiment, the second plate 221, the first side wall 221a, the second side wall 221b, and the third side wall 221c may be formed to be open on one side (e.g., a front face) in order to accommodate (or surround) at least a portion of the first housing 201. For example, the first housing 201 may be coupled to the second housing 202 to be at least partially wrapped thereby, and may slide in the direction parallel to the first face F1 or the second face F2, for example, in the direction of an arrow ①, while being guided by the second housing 202. According to an embodiment, the second plate 221, the first side wall 221a, the second side wall 221b, and/or the third side wall 221c may be integrally formed. According to another embodiment, the second plate 221, the first side wall 221a, the second side wall 221b, and/or the third side wall 221c may be formed as separate housings, and may then be combined or assembled.

According to various embodiments, the second plate 221 and/or the first side wall 221a may cover at least a portion of the flexible display 203. For example, at least a portion of the flexible display 203 may be received inside the second housing 202, and the second plate 221 and/or the first side wall 221a may cover at least a portion of the flexible display 203 that is received inside the second housing 202.

According to various embodiments, the first housing 201 is able to move relative to the second housing 202 in a first direction (e.g., the direction C)) parallel to the second side wall 221b or the third side wall 221c so as to switch to the opened state and the closed state, and the first housing 201 may move to be positioned at a first distance from the first side wall 221a in the closed state and to be positioned at a second distance, which is greater than the first distance, from the first side wall 221a in the opened state. In various embodiments, the first housing 201 may surround a portion of the first side wall 221a in the closed state.

According to various embodiments, the electronic device 200 may include a display 203, a key input device 241, a connector hole 243, audio modules 247a and 247b, or camera modules 249a and 249b. Although not shown, the electronic device 200 may further include an indicator (e.g., an LED device) or various sensor modules. The configurations of the display 203, the audio modules 247a and 247b, and the camera modules 249a and 249b in FIGS. 2 and 3 may be entirely or partly the same as the configurations of the display module 160, the audio module 170, and the camera module 180 in FIG. 1.

According to various embodiments, the display 203 may include a first display area A1 and a second display area A2. According to an embodiment, the first display area A1 may be disposed on the first housing 201. For example, the first display area A1 may extend substantially across at least a portion of the first face F1 to be disposed on the first face F1. The second display area A2 may extend from the first display area A1, and may be inserted or received inside the second housing 202 (e.g., a structure) or may be exposed to the outside of the second housing 202 according to the sliding movement of the first housing 201.

According to various embodiments, the second display area A2 may move while being substantially guided by a roller (e.g., the roller 250 in FIG. 4) that is mounted to the first housing 201, thereby being received inside the second housing 202 or a space formed between the first housing 201 and the second housing 202, or being exposed to the outside thereof. According to an embodiment, the second display area A2 may move based on the sliding movement of the first housing 201 in the first direction (e.g., the direction indicated by an arrow ①). For example, while the first housing 201 slides, a portion of the second display area A2 may be deformed into a curved shape at the position corresponding to the roller 250.

According to various embodiments, if the first housing 201 moves from the closed state to the opened state when viewed from above the first plate 211 (e.g., the slide plate), the second display area A2 may be gradually exposed to the outside of the second housing 202, thereby forming a substantially flat surface with the first display area A1. The display 203 may be combined with or disposed adjacent to a touch sensing circuit, a pressure sensor capable of measuring the intensity (pressure) of a touch, and/or a digitizer that detects a magnetic-field type stylus. In an embodiment, the second display area A2 may be at least partially received inside the second housing 202, and a portion of the second display area A2 may be visually exposed to the outside even in the state (e.g., the closed state) shown in FIG. 2. According to an embodiment, regardless of the closed state or the opened state, a portion of the exposed second display area A2 may be positioned on the roller (e.g., the roller 250 in FIG. 4), and a portion of the second display area A2 may maintain a curved shape at the position corresponding to the roller 250.

According to various embodiments, the electronic device 200 may include at least one hinge structure 240. According to an embodiment, the hinge structure 240 may connect the first housing 201 and the second housing 202. For example, the hinge structure 240 may be connected to the first plate 211 and the second plate 221. According to an embodiment, the hinge structure 240 may transfer a driving force for guiding the sliding movement of the first housing 201 to the first housing 201. For example, the hinge structure 240 may include an elastic material (e.g., a spring), and may provide an elastic force in a first direction (e.g., the direction ① in FIG. 3), based on the sliding movement of the first housing 201.

According to various embodiments, the key input device 241 may be positioned in one area of the first housing 201. The electronic device 200 may be designed to exclude the illustrated key input device 241, or to include additional key input device(s) depending on the appearance and the usage state. According to an embodiment, the electronic device 200 may include a key input device that is not shown, for example, a home key button or a touch pad disposed around the home key button. According to another embodiment, at least a portion of the key input device 241 may be disposed on the first side wall 221a, the second side wall 221b, or the third side wall 221c of the second housing 202.

According to various embodiments, the connector hole 243 may be omitted according to an embodiment, and accommodate a connector (e.g., a USB connector) for transmitting and receiving power and/or data to and from an external electronic device. Although not shown, the electronic device 200 may include a plurality of connector holes 243, and some of the plurality of connector holes 243 may function as connector holes for transmitting and receiving audio signals to and from an external electronic device. Although the connector hole 243 is disposed on the third side wall 221c in the illustrated embodiment, the disclosure is not limited thereto, and the connector hole 243 or a connector hole that is not shown may be disposed on the first side wall 221a or the second side wall 221b.

According to various embodiments, the audio modules 247a and 247b may include at least one speaker hole 247a or at least one microphone hole 247b. One of the speaker holes 247a may be provided as a receiver hole for voice calls, and the other thereof may be provided as an external speaker hole. The electronic device 200 may include a microphone to obtain sound, and the microphone may obtain sound outside the electronic device 200 through the microphone hole 247b. According to an embodiment, the electronic device 200 may include a plurality of microphones in order to detect the direction of sound. According to an embodiment, the electronic device 200 may include an audio module in which the speaker hole 247a and the microphone hole 247b are implemented as one hole, or include a speaker (e.g., a piezo speaker) excluding the speaker hole 247a.

According to various embodiments, the camera modules 249a and 249b may include a first camera module 249a and a second camera module 249b. The second camera module 249b may be positioned in the first housing 201, and may photograph a subject in the direction opposite the first display area A1 of the display 203. The electronic device 200 may include a plurality of camera modules 249a and 249b. For example, the electronic device 200 may include at least one of a wide-angle camera, a telephoto camera, and a close-up camera, and, according to an embodiment, may include an infrared projector and/or an infrared receiver measure, thereby measuring the distance to the subject. The camera modules 249a and 249b may include one or more lenses, an image sensor, and/or an image signal processor. The electronic device 200 may further include another camera module (the first camera module 249a) (e.g., a front camera) to photograph a subject in the opposite direction of the display 203. For example, the first camera module 249a may be disposed around the first display area A1 or in the area overlapping the display 203, and in the case where the first camera module 249a is disposed in the area overlapping the display 203, a subject may be photographed through the display 203.

According to various embodiments, the indicator (not shown) of the electronic device 200 may be disposed in the first housing 201 or the second housing 202, and may include a light-emitting diode, thereby providing state information on the electronic device 200 using a visual signal. The sensor module (not shown) of the electronic device 200 may produce an electric signal or data value corresponding to the internal operation state of the electronic device 200 or the external environmental state. The sensor module, for example, may include a proximity sensor, a fingerprint sensor, or a biometric sensor (e.g., an iris/face recognition sensor or an HRM sensor). In another embodiment, the sensor module may further include at least one of, for example, a gesture sensor, a gyro sensor, an atmospheric pressure sensor, a magnetic sensor, an acceleration sensor, a grip sensor, a color sensor, an infrared (IR) sensor, a temperature sensor, a humidity sensor, or an illuminance sensor.

Figure 4:
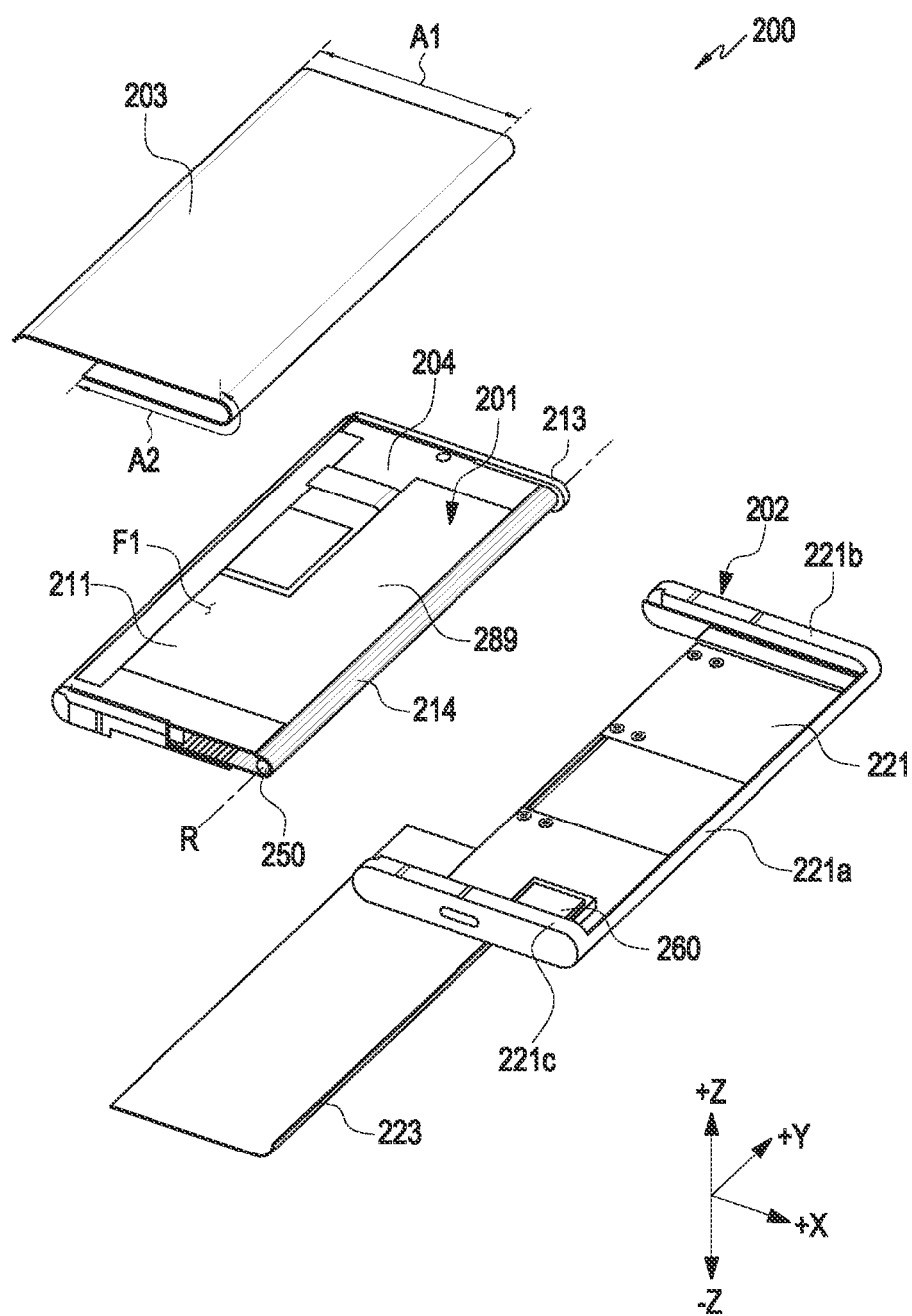
FIG. 4 is an exploded perspective view of an electronic device according to various embodiments.

FIG. 4 is an exploded perspective view of an electronic device according to various embodiments.

Referring to FIG. 4, an electronic device 200 may include a first housing 201, a second housing 202, a display 203 (e.g., a flexible display, a foldable display, or a rollable display), a roller 250, and a multi-joint hinge structure 213. A portion (e.g., a second display area A2) of the display 203 may be received inside the electronic device 200 while being guided by the roller 250. The configurations of the first housing 201, the second housing 202, and the display 203 in FIG. 4 may be entirely or partly the same as the configurations of the first housing 201, the second housing 202, and the display 203 in FIGS. 2 and 3.

According to various embodiments, the first housing 201 may include a first plate 211. The first plate 211 may be mounted to the second housing 202, and may reciprocate linearly in one direction (e.g., the direction of the arrow ① in FIG. 1) while being guided by the second housing 202. According to an embodiment, the first plate 211 may include a first face F1, and the first display area A1 of the display 203 may be substantially mounted to the first face F1 and maintained in a flat shape. According to an embodiment, the first plate 211 may be formed of a metal material and/or a non-metal (e.g., polymer) material. According to an embodiment, the first plate 211 may accommodate components (e.g., a battery 289 (e.g., the battery 189 in FIG. 1) and a circuit board 204) of the electronic device 200.

According to various embodiments, the multi-joint hinge structure 213 may be connected to the first housing 201. For example, as the first housing 201 slides, the multi-joint hinge structure 213 may move relative to the second housing 202. The multi-joint hinge structure 213 may be substantially received inside the second housing 202 in the closed state (e.g., FIG. 2). According to an embodiment, at least a portion of the multi-joint hinge structure 213 may be positioned between the first plate 211 of the first housing 201 and the second plate 221 and/or the first side wall 221a of the second housing 202, and may move to correspond to the roller 250.

According to various embodiments, the multi-joint hinge structure 213 may include a plurality of bars or rods 214. The plurality of rods 214 may extend straight to be disposed parallel to a rotation axis R of the roller 250, and may be arranged along the direction (e.g., the direction in which the first housing 201 slides) perpendicular to the rotation axis R.

According to various embodiments, each rod 214 may revolve around another adjacent rod 214 while maintaining parallel to another adjacent rod 214. According to an embodiment, as the first housing 201 slides, the plurality of rods 214 may be arranged to form a curved surface, or may be arranged to form a flat surface. For example, as the first housing 201 slides, a portion of the multi-joint hinge structure 213, which faces the roller 250, may form a curved space, and the other portions of the multi-joint hinge structure 213, which do not face the roller 250, may form a flat surface. According to an embodiment, the second display area A2 of the display 203 may be mounted or supported on the multi-joint hinge structure 213, and at least a portion of the second display area A2 may be exposed to the outside of the second housing 202 together with the first display area A1 in the opened state (e.g., FIG. 3). In the state in which the second display area A2 is exposed to the outside of the second housing 202, the multi-joint hinge structure 213 may form a substantially flat surface, thereby supporting or maintaining the second display area A2 to be flat. According to an embodiment, the multi-joint hinge structure 213 may be replaced with a flexible and integral support member (not shown).

According to various embodiments, the second housing 202 may include a third plate 223. According to an embodiment, the third plate 223 may form substantially at least a portion of the second housing 202 or the exterior of the electronic device 200. For example, the third plate 223 may be coupled to the outer surface of the second plate 221. According to an embodiment, the third plate 223 may be formed integrally with the second plate 221. According to an embodiment, the third plate 223 may provide a decorative effect to the exterior of the electronic device 200. The second plate 221 may be manufactured using at least one of metal or polymer, and the third plate 223 may be manufactured using at least one of metal, glass, synthetic resin, or ceramic. According to an embodiment, the second plate 221 and/or the third plate 223 may be manufactured of the material that transmits light at least partially (e.g., an auxiliary display area). For example, in the state in which a portion (e.g., the second display area A2) of the display 203 is received inside the electronic device 200, the electronic device 200 may output visual information using the second display area A2. The auxiliary display area may be a portion of the second plate 221 and/or the third plate 223 at which the display 203 received inside the second housing 202 is positioned.

According to various embodiments, the roller 250 may be disposed inside the first housing 201. For example, the roller 250 may be rotatably mounted to one edge of the first plate 211 of the first housing 201. According to an embodiment, the roller 250 may guide the rotation of the second display area A2 while rotating along the rotation axis R.

According to various embodiments, the electronic device 200 may include a speaker module 260. The speaker module 260 may be disposed in the second housing 202. The configuration of the speaker module 260 in FIG. 4 may be entirely or partly the same as the configuration of the audio module 170 in FIG. 1.

Figure 5:
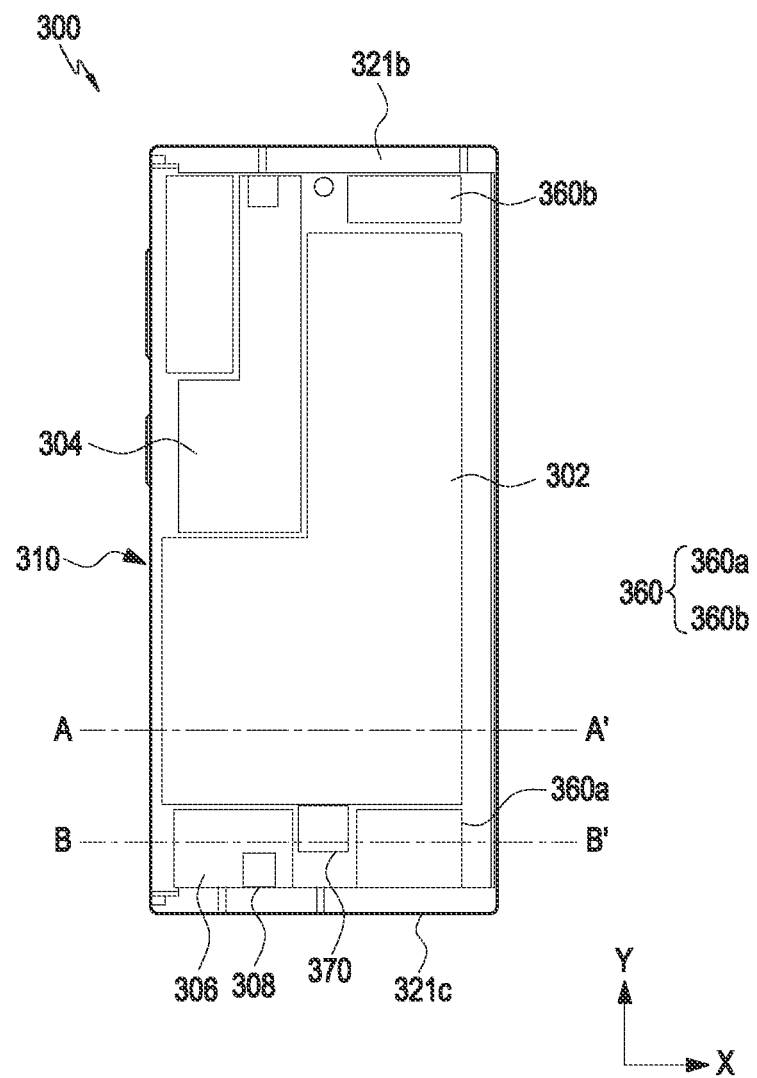
FIG. 5 is a diagram illustrating an electronic device on which a display is projected according to various embodiments.
Figure 6A:
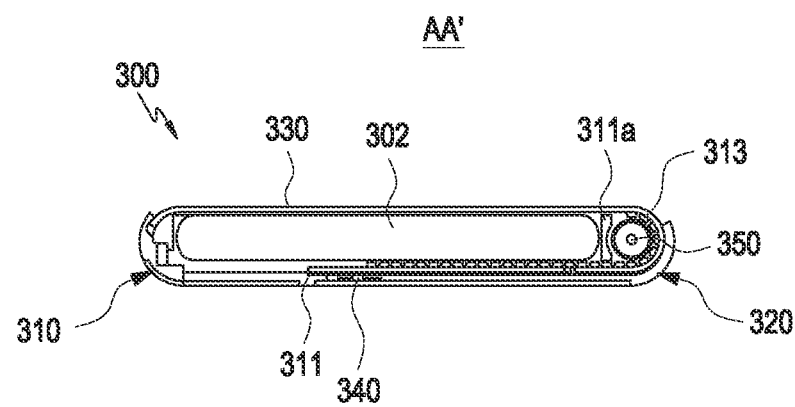
FIG. 6A is a cross-sectional view taken along the line A-A' in FIG. 5 according to various embodiments.
Figure 6B:
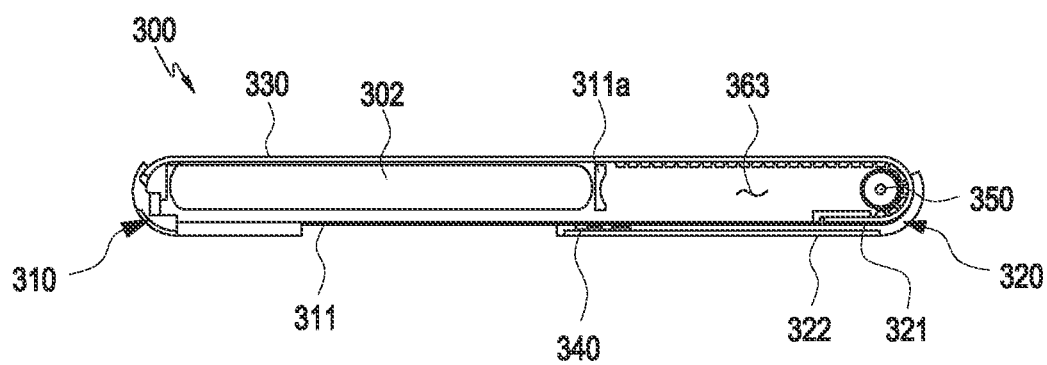
FIG. 6B is a cross-sectional view in which the electronic device in FIG. 6A is stretched according to various embodiments.
Figure 7A:
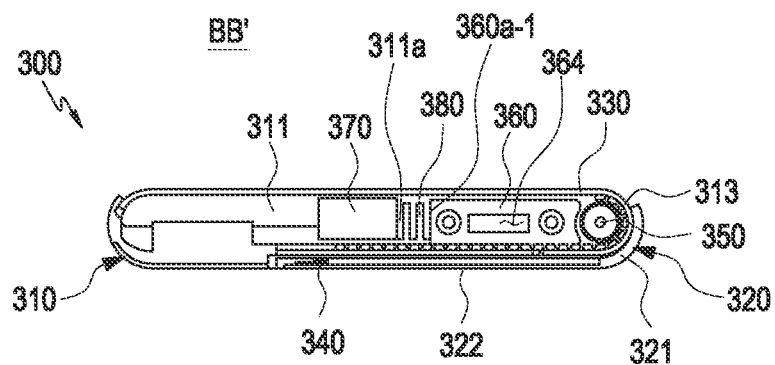
FIG. 7A is a cross-sectional view taken along the line B-B' in FIG. 5 according to various embodiments.
Figure 7B:
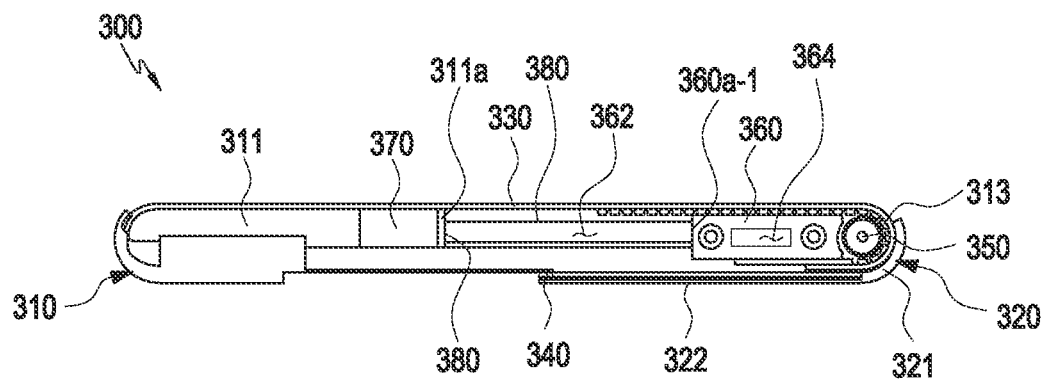
FIG. 7B is a cross-sectional view in which the electronic device in FIG. 7A is stretched according to various embodiments.
Figure 8A:
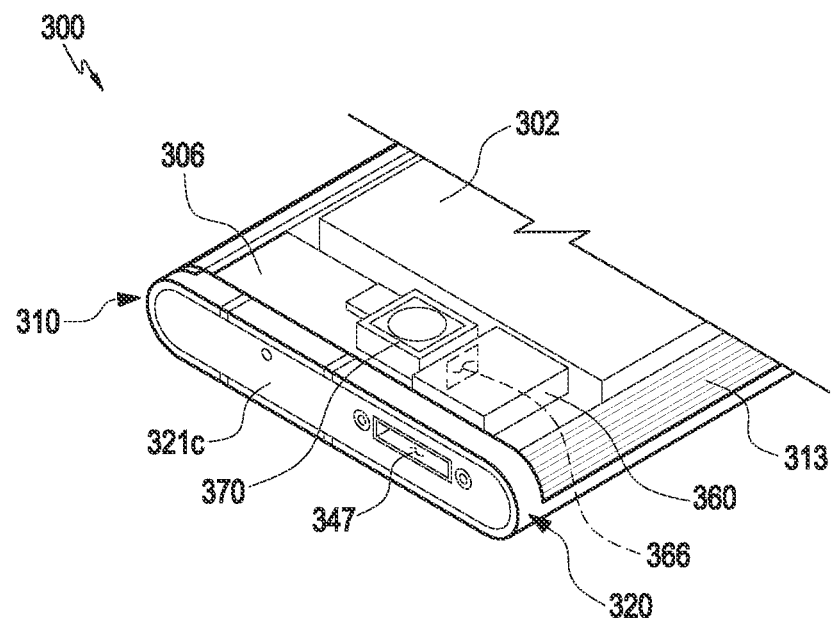
FIG. 8A is an internal perspective view of an electronic device in a closed state according to various embodiments.
Figure 8B:
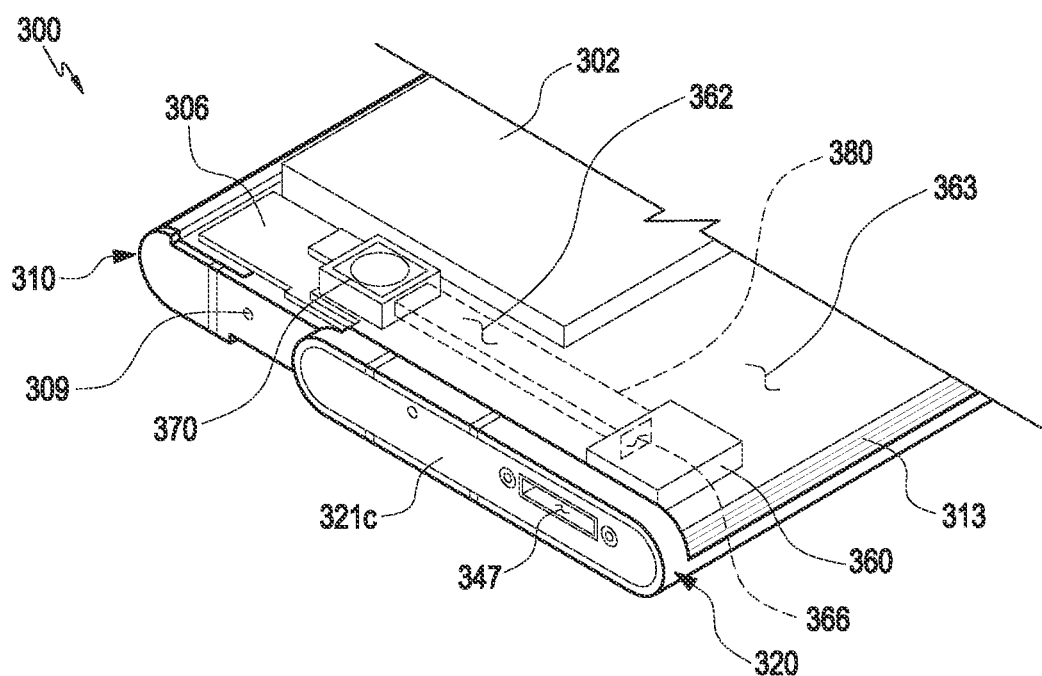
FIG. 8B is a perspective view of an electronic device in an opened state according to various embodiments.

FIG. 5 is a diagram illustrating an electronic device on which a display is projected according to various embodiments. FIG. 6A is a cross-sectional view taken along the line A-A' in FIG. 5, and FIG. 6B is a cross-sectional view of the electronic device in the state of being stretched in FIG. 6A according to various embodiments. FIG. 7A is a cross-sectional view taken along line B-B' in FIG. 5, and FIG. 7B is a cross-sectional view of the electronic device in the state of being stretched in FIG. 7A according to various embodiments. FIG. 8A is an internal perspective view of an electronic device in a closed state, and FIG. 8B is a perspective view of an electronic device in an opened state according to various embodiments.

Referring to FIGS. 5, 6A, 6B, 7A, 7B, 8A, and 8B, a first housing 310 may slide relative to a second housing 320. The configurations of an electronic device 300, a first housing 310, a first plate 311, a multi-joint hinge structure 313, a second housing 320, and a roller 350 in FIGS. 5, 6A, 6B, 7A, 7B, 8A, and 8B may be entirely or partly the same as the configurations of the electronic device 200, the first housing 201, the first plate 211, the multi-joint hinge structure 213, the second housing 202, and the roller 250 in FIG. 4.

According to various embodiments, the first housing 310 may accommodate components of the electronic device 300. For example, at least one of a battery 302, a main printed circuit board 304 on which a processor (e.g., the processor 120 in FIG. 1) is mounted, an auxiliary circuit board 306 on which a microphone module 308 is mounted, and a motor module 370 may be disposed on the first plate 311 of the first housing 310.

According to various embodiments, the first plate 311 may include a first plate surface 311a facing the second housing 320. For example, the first plate surface 311a may face in a first direction (e.g., the X-axis direction) in which the first housing 310 slides.

According to various embodiments, the electronic device 300 may include speaker module 360. According to an embodiment, the speaker module 360 may be disposed inside the second housing 320. According to an embodiment, the speaker module 360 may include a speaker unit (e.g., the speaker unit 410 in FIG. 9A) configured to generate sound, based on an electric signal, and a speaker enclosure (e.g., the speaker enclosure 420 in FIG. 9A) accommodating the speaker unit. The speaker enclosure 420 may include an emission hole 364 for transmitting a vibration produced by the speaker unit 410 to the outside of the electronic device 300. The emission hole 364 may be connected to a speaker hole 347 formed in the second side wall 321b or the third side wall 321c. According to an embodiment, the electronic device 300 may include a plurality of speaker modules 360a and 360b. For example, the electronic device 300 may include a first speaker module 360a adjacent to the third side wall 321c and a second speaker module 360b adjacent to the second side wall 321b.

According to various embodiments, the electronic device 300 may include a resonance space 362 formed inside the electronic device 300. According to an embodiment, a resonance space 362 of the speaker module 360 configured to change in the volume thereof, based on the sliding movement of the first housing 310, may be formed inside the electronic device 300. According to an embodiment, the resonance space 362 may be a space surrounded by the speaker module 360 (e.g., the speaker enclosure 420 in FIG. 9A), a sealing member 380, and the first housing 310. For example, when the first housing 310 is in the opened state (e.g., FIG. 3), an empty space may be formed adjacent to the speaker module 360 inside the electronic device 300, and resonance of sound may occur in the empty space. According to an embodiment, the speaker module 360 may include a speaker resonance space (not shown). Vibration generated in the speaker module 360 may resonate in the resonance space 362 and the speaker resonance space (not shown). According to an embodiment, a resonance hole 366 facing the resonance space 362 may be excluded from the speaker module 360. For example, vibration generated in the speaker module 360 may be transmitted to the resonance space 362 through the speaker enclosure 420.

According to various embodiments, the performance of the speaker module 360 in a low-pitched band (e.g., a band of 200 to 800 Hz) may be improved based on the size (e.g., the volume) of the resonance space 362. For example, the loudness in the low-pitched band may increase based on the size of the resonance space 362.

According to various embodiments, the electronic device 300 may include an inner space 363 formed based on the sliding movement of the first housing 310. According to an embodiment, the inner space 363 may be an empty space inside the electronic device 300, which is formed in the opened state of the electronic device 300 (e.g., FIG. 8B). According to an embodiment, the inner space 363 may be located adjacent to the speaker module 360, and the sound generated by the speaker module 360 may resonate in the resonance space 362, the inner space 363, and/or the speaker resonance space (not shown) located inside the speaker module 360.

According to various embodiments, the electronic device 300 may include a motor module 370. According to an embodiment, the motor module 370 may produce a rotational force using the power received from a battery 302. According to an embodiment, the motor module 370 may be disposed in the first plate 311 of the first housing 310, and may be connected to the second plate 321 of the second housing 320. The first housing 310 may slide relative to the second housing 320, based on the rotational force produced by the motor module 370. According to another embodiment, the motor module 370 may be disposed inside the second plate 321 of the second housing 320, and may be connected to the multi-joint hinge structure 313 or the first plate 311. According to an embodiment, the motor module 370 may be excluded. For example, the electronic device 300 may be opened or closed by the force provided by a user.

According to various embodiments, the first housing 310 and the second housing 320 may be connected through a hinge structure 340 (e.g., the hinge structure 240 in FIG. 3). According to an embodiment, the hinge structure 340 disposed on the second plate 321 or a third plate 322 (e.g., the third plate 223 in FIG. 4) may be connected to the first plate 311 of the first housing 310.

According to various embodiments, the electronic device 300 may include a sealing member (e.g., a seal) 380 (e.g., a flexible sealing member) connected to the first housing 310 and the speaker module 360. According to an embodiment, the sealing member 380 may vary based on the sliding movement of the first housing 310. The position or shape (e.g., the length) of the sealing member 380 may vary based on a change in the state of the electronic device 300. For example, the length of the sealing member 380 in the closed state of the electronic device 300 (e.g., FIG. 2) may be less than the length of the sealing member 380 in the opened state of the electronic device 300 (e.g., FIG. 3). For example, the sealing member 380 may be folded when the electronic device 300 is in the closed state (e.g., FIG. 2), and the sealing member 380 may be unfolded when the electronic device 300 is in the opened state (e.g., FIG. 3). As another example, the sealing member 380 may be unfolded when the electronic device 300 is in the closed state (e.g., FIG. 2), and the sealing member 380 may be folded when the electronic device 300 is in the opened state (e.g., FIG. 3). According to an embodiment, the position of the sealing member 380 may change according to the sliding movement of the first housing 310. According to an embodiment, the sealing member 380 may surround at least a portion of the resonance space 362. For example, the sealing member 380 may be connected to a first speaker enclosure surface 360*a*-1 facing the first housing 310 and a first plate surface 311*a* of the first plate 311. According to an embodiment, the sealing member 380 may be formed of a flexible material. For example, the sealing member 380 may include a flexible film. According to an embodiment, the sealing member 380 may be formed in a closed curve shape.

According to various embodiments, the electronic device 300 may include at least one air vent 309. The at least one air vent 309 is a hole or a recess formed in the first housing 310 of the electronic device 300, and may enable the flow of gas between the outside of the electronic device 300 and the inside of the electronic device 300. According to an embodiment, the air vent 309 may provide a path of air between the outside of the electronic device 300 and the inside of the electronic device 300, based on the state of the electronic device 300. For example, the air vent 309 may be exposed to the outside to provide a path through which gas flows when the electronic device 300 is in the opened state (e.g., FIG. 8B), and the air vent 309 may be covered by the second housing 320 when the electronic device 300 is the closed state (e.g., FIG. 8A) so that the air vent 309 may not be used as a path of gas. According to an embodiment, the electronic device 300 may include a protective cover (not shown) made of a mesh material for preventing and/or reducing inflow of foreign substances through the air vent 309. The protective cover may cover the air vent 309.

Figure 9A:
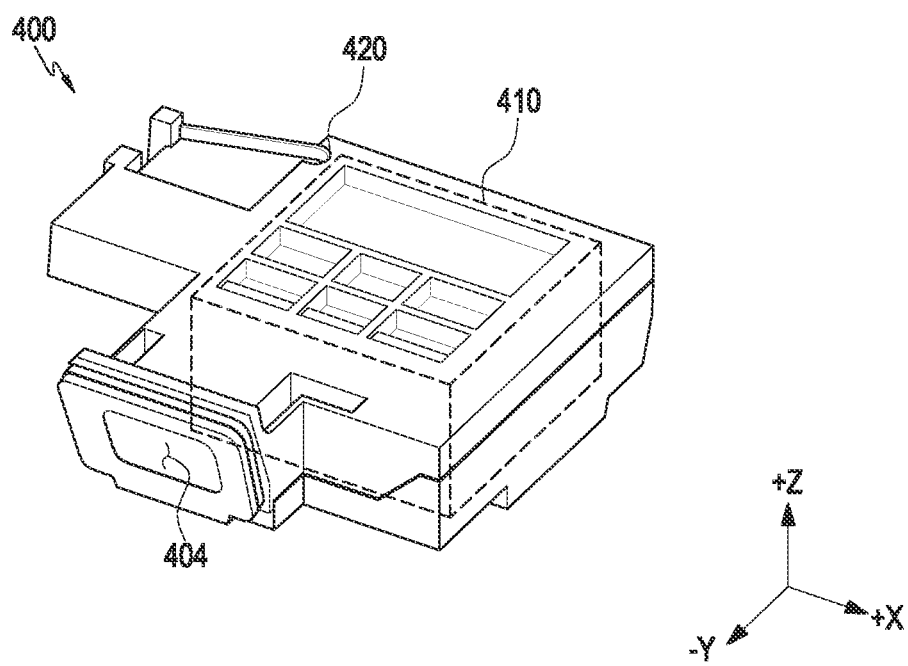
FIGS. 9A and 9B are perspective views of a speaker module according to various embodiments.
Figure 9B:
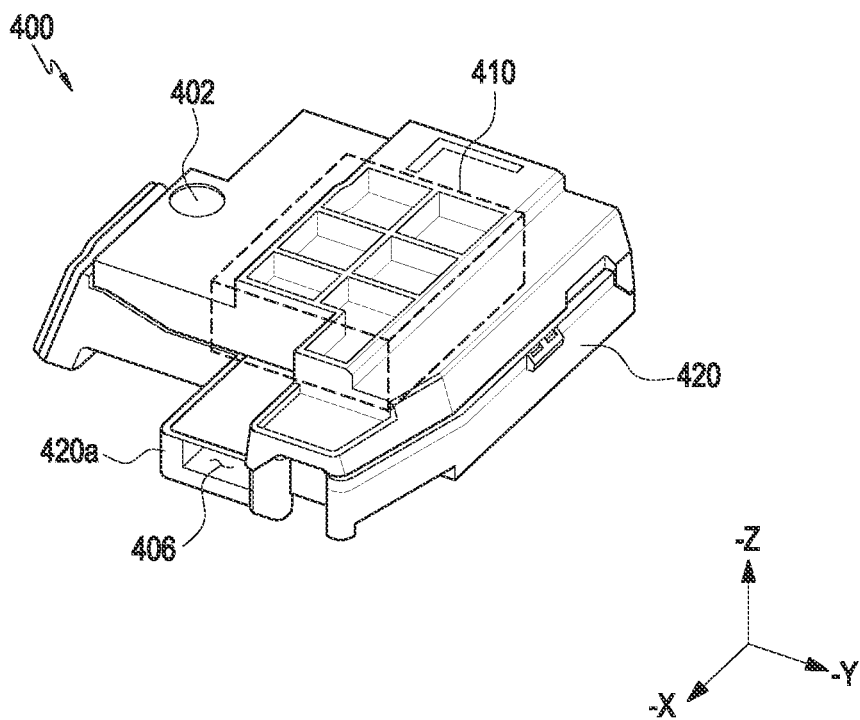

FIGS. 9A and 9B are perspective views illustrating an example speaker module according to various embodiments.

Referring to FIGS. 9A and 9B, a speaker module 400 may include a speaker unit (e.g., including at least one speaker) 410 and a speaker enclosure 420. The configuration of the speaker module 400 in FIGS. 9A and 9B may be entirely or partly the same as that of the speaker module 360 in FIGS. 8A and 8B.

According to various embodiments, the speaker module 400 may include a speaker unit 410 and a speaker enclosure 420.

According to various embodiments, the speaker unit 410 may convert an electric signal into a sound. According to an embodiment, the speaker unit 410 may include at least one of a coil (e.g., a voice coil) (not shown) configured to vibrate a vibration plate, based on pulse width modulation (PWM), a vibration plate (e.g., a diaphragm) (not shown) configured to vibrate, a damping member (e.g., a spring) (not shown)

formed of a conductive material and transmitting a signal (e.g., power) received from the outside of the speaker module 400 to the coil, a magnet (not shown), or a conductive plate (not shown) for concentrating the magnetic field generated by the magnet.

According to various embodiments, the speaker enclosure 420 may form at least a portion of the outer surface of the speaker module 400. For example, the speaker enclosure 420 may accommodate the speaker unit 410. According to an embodiment, the speaker enclosure 420 may be configured to include at least one of a protective cover for protecting the vibration plate, a frame (not shown) for accommodating components (e.g., the coil, the vibration plate, and the damping member) of the speaker unit 410, or a yoke for protecting components (e.g., a magnet) of the speaker unit 410. For example, the speaker enclosure 420 may indicate a housing or casing that surrounds the speaker unit 410. According to an embodiment, at least a portion of the speaker enclosure 420 may be used as a soundbox for accumulating at least a portion of the sound generated by the speaker unit 410.

According to various embodiments, the speaker enclosure 420 may include at least one vent hole 402. According to an embodiment, the vent hole 402 is a hole passing through the speaker enclosure 420, and may enable the flow of gas between the outside of the speaker module 400 and the inside of the speaker module 400. According to an embodiment, the speaker module 400 may include a protective cover (not shown) made of a mesh material for preventing and/or reducing inflow of external foreign substances through the vent hole 402. The protective cover may cover the vent hole 402.

According to various embodiments, the speaker module 400 may include an emission hole 404. The emission hole 404 may form a path for transmitting vibration generated by the vibration plate of the speaker unit 410 to the outside of the speaker module 400 or electronic device (e.g., the electronic device 200 in FIG. 2). According to an embodiment, the emission hole 404 may be a hole formed in the speaker enclosure 420 to face at least a portion of the vibration plate (not shown) of the speaker unit 410. The configuration of the emission hole 404 in FIGS. 9A and 9B may be entirely or partly the same as the configuration of the emission hole 364 in FIGS. 7A and 7B.

According to various embodiments, the speaker module 400 may include a resonance hole 406. According to an embodiment, the electronic device (e.g., the electronic device 200 in FIG. 2) may include a resonance space (e.g., the resonance space 362 in FIG. 8B) connected to the resonance hole 406. For example, the resonance hole 406 may be a hole formed in a first speaker enclosure surface 420a facing the first housing (e.g., the first housing 310 in FIG. 8A). According to an embodiment, the resonance hole 406 may be formed in a direction different from that of the emission hole 404. For example, the emission hole 404 may be positioned to face the outside of the electronic device (e.g., the electronic device 300 in FIG. 7A), and the resonance hole 406 may be positioned to face the inside of the electronic device 300. The configuration of the resonance hole 406 in FIGS. 9A and 9B may be entirely or partly the same as the configuration of the resonance hole 366 in FIGS. 7A and 7B. According to an embodiment, the configuration of the resonance hole 406 may be excluded.

According to various embodiments, the speaker module 400 may include an internal resonance space (not shown) formed inside the speaker enclosure 420. For example, the electronic device (e.g., the electronic device 300 in FIG. 8B) may include an internal resonance space (not shown) of the speaker module 400 and a resonance space (e.g., the resonance space 362 in FIG. 8B) of the electronic device 300 connected to the resonance hole 406, and may improve the performance of the speaker module 400 in a low-pitched band.

FIGS. 10A, 10B, 11A, 11B, 12A, 13B, 14A, 14B, 15A, 15B, 16A, and 16B are diagrams illustrating examples of a first housing and a speaker module according to various embodiments.

Referring to FIGS. 10A, 10B, 11A, 11B, 12A, 13B, 14A, 14B, 15A, 15B, 16A, and 16B, an electronic device 500 may include a first speaker enclosure 510, a speaker module 520, a speaker unit 530, a second speaker enclosure 540, and a sealing member (e.g., a seal) 550 (e.g., a flexible sealing member). Configurations of the electronic device 500, the first speaker enclosure 510, and the sealing member 550 in FIGS. 10A, 10B, 11A, 11B, 12A, 13B, 14A, 14B, 15A, 15B, 16A, and 16B may be entirely or partly the same as the configurations of the electronic device 300, the first housing 310, and the sealing member 380 in FIGS. 7A and 7B, and configurations of a speaker module 520, an emission hole 522, a resonance hole 524, a speaker unit 530, and a second speaker enclosure 540 may be entirely or partly the same as the configurations of the speaker module 400, the emission hole 404, the resonance hole 406, the speaker unit 410, and the speaker enclosure 420 in FIGS. 9A and 9B. According to an embodiment, the electronic device 500 may include a resonance space 560 that changes according to the shape of the sealing member 550 connected to the speaker module 520. According to an embodiment, it may be construed that the sealing member 550 and the resonance space 560 are included in the speaker module 520.

According to various embodiments, the speaker enclosures 510 and 540 may include a first speaker enclosure 510 and a second speaker enclosure 540. According to an embodiment, a portion (e.g., the first plate surface 311a in FIG. 7B) of the first housing (e.g., the first housing 310 in FIG. 8A) may be referred to as a first speaker enclosure 510. For example, the second speaker enclosure 540 may accommodate the speaker unit 530 together with the first housing 310, and a portion of the first housing 310 accommodating the speaker unit 530 may be referred to as a first speaker enclosure 510.

According to various embodiments, the electronic device 500 may include a resonance space 560. According to an embodiment, the resonance space 560 may be a space formed by the first speaker enclosure 510, the second speaker enclosure 540, and the sealing member 550. The resonance space 560 may be connected to the speaker unit 530 through the resonance hole 524, and the amplitude of at least a portion of the vibration generated by the speaker unit 530 may be increased in the resonance space 560.

According to various embodiments, the first housing (e.g., the first housing 310 in FIG. 8A) or the first speaker enclosure 510 may include at least one first guide member (e.g., first guide) 512. According to an embodiment, the first guide member 512 may extend in a first direction (e.g., the X-axis direction) toward the speaker unit 530 from the first housing 310 or the first speaker enclosure 510. For example, at least a portion of the first speaker enclosure 510 may include a first plate surface (e.g., the first plate surface 311a in FIG. 7B) of the first housing 310. According to an embodiment, the first guide member 512 may have a cylindrical shape in which the area facing the resonance hole 524 of the speaker module 520 is open. According to an embodiment, the first guide member 512 may guide movement of the sealing member 550. For example, the first guide member 512 may be connected to a first end 550a of the sealing member 550, and, as the first housing 310 slides, move in a first direction (e.g., the X-axis direction), thereby guiding the movement of the sealing member 550 in the first direction. According to an embodiment, the first guide member 512 may be formed integrally with the first housing 310 or the first speaker enclosure 510.

According to various embodiments, the speaker module 520 may include at least one second guide member (e.g., second guide) 542. According to an embodiment, the second guide member 542 may protrude from the second speaker enclosure 540 of the speaker module 520 toward the first speaker enclosure 510. According to an embodiment, the second guide member 542 may guide the movement of the sealing member 550. For example, the second guide member 542 may be fixed to the second housing (e.g., the second housing 320 in FIG. 4) while being connected to a second end 550b opposite the first end 550a of the sealing member 550 to prevent and/or reduce separation of the sealing member 550. According to an embodiment, the second guide member 542 may be integrally formed with the second speaker enclosure 540.

According to various embodiments, the sealing member 550 may be connected to the first speaker enclosure 510 and the second speaker enclosure 540, and the sealing member 550 may prevent and/or reduce inflow of foreign substances into the speaker module 520. According to an embodiment, the sealing member 550 may form a resonance space 560 together with the first speaker enclosure 510 and the second speaker enclosure 540.

According to various embodiments, the sealing member 550 may include a first end 550a connected to a slidable configuration (e.g., the first housing (e.g., the first speaker enclosure 510 or the first housing 310 in FIG. 8A)) and a second end 550b opposite the first end 550a, which is mounted to a fixed configuration (e.g., the second speaker enclosure 540 or the second housing 320 in FIG. 8A). According to an embodiment (e.g., FIGS. 11A and 11B), the first end 550a of the sealing member 550 may be connected to the first guide member 512, and the second end 550b may be connected to the second guide member 542. According to an embodiment (e.g., FIGS. 10A and 10B), the second guide member 542 may include a first area 544 surrounding the first guide member 512. The first area 544 may have the shape of a closed curve and face at least a portion of the first guide member 512. The first end 550a of the sealing member 550 may be connected to the first guide member 512, and the second end 550b may be connected to the first area 544 of the second guide member 542.

According to various embodiments, the first speaker enclosure 510 may include a first partition wall 514 extending from the first guide member 512. According to an embodiment, the first partition wall 514 may protrude from the end of the first guide member 512 in a second direction (e.g., the Y-axis direction) substantially perpendicular to the first guide member 542. According to an embodiment, the sealing member 550 may be connected to the first partition wall 514 and the second guide member 542.

Figure 12A:
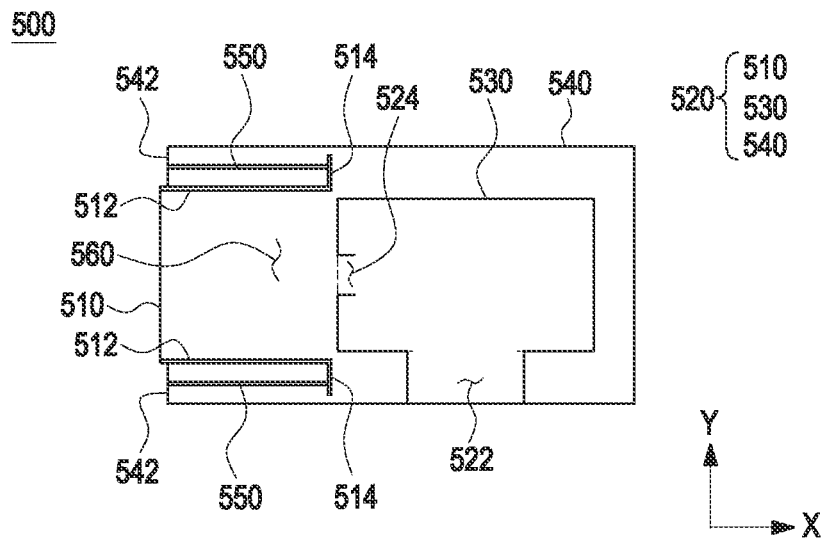
Figure 12B:
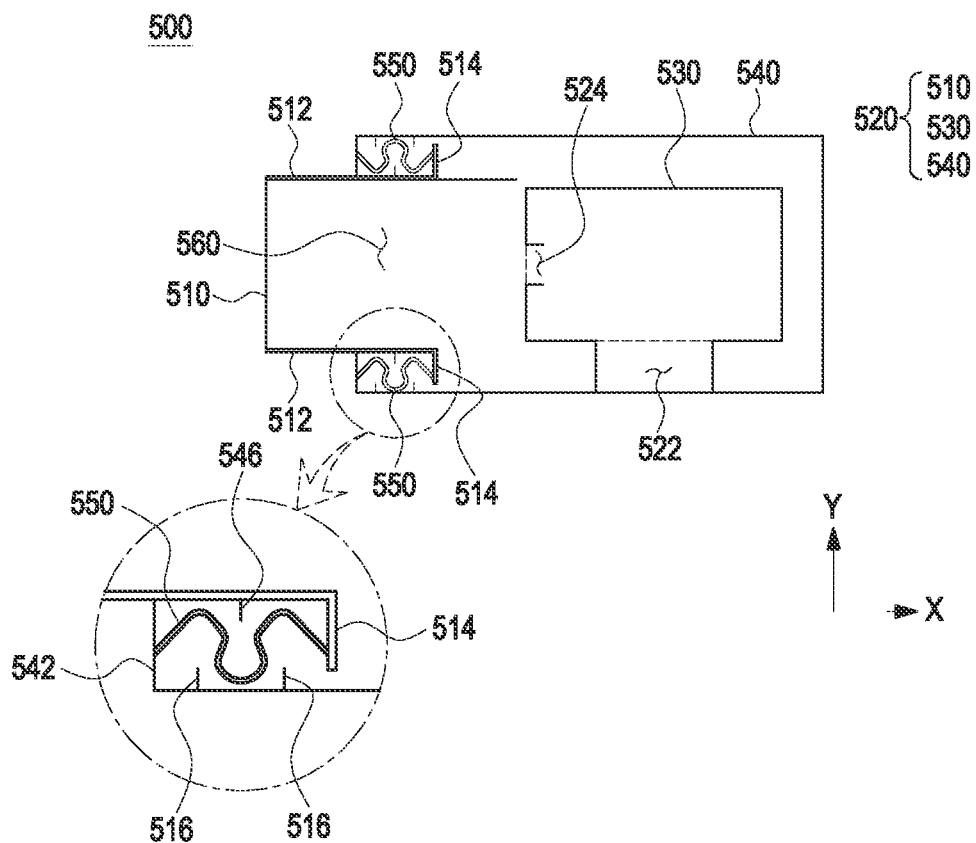

According to various embodiments (e.g., FIGS. 12A and 12B), the first housing (e.g., the first housing 310 in FIG. 7A) or the first speaker enclosure 510 may include at least one first protrusion area 516 protruding from the first guide member 512 toward the second speaker enclosure 540. According to an embodiment, the first protrusion area 516 may protrude in a second direction (e.g., the Y-axis direction) substantially perpendicular to the sliding direction (e.g., the X-axis direction) of the first housing 310.

According to various embodiments (e.g., FIGS. 12A and 12B), the second speaker enclosure 540 may include at least one second protrusion area 546 protruding toward the first guide member 512. According to an embodiment, the second protrusion area 546 may protrude in a second direction (e.g., the Y-axis direction) substantially perpendicular to the sliding direction (e.g., the X-axis direction) of the first housing 310.

According to various embodiments, the first protrusion area 516 and the second protrusion area 546 may guide the movement of the sealing member 550. For example, when the electronic device 500 is in the closed state (e.g., FIG. 12B), the sealing member 550 may be received inside the electronic device 500 to correspond to the shapes of the first protrusion area 516 and the second protrusion area 546, thereby reducing or preventing detorsion or tangle of the sealing member 550.

Figure 13A:
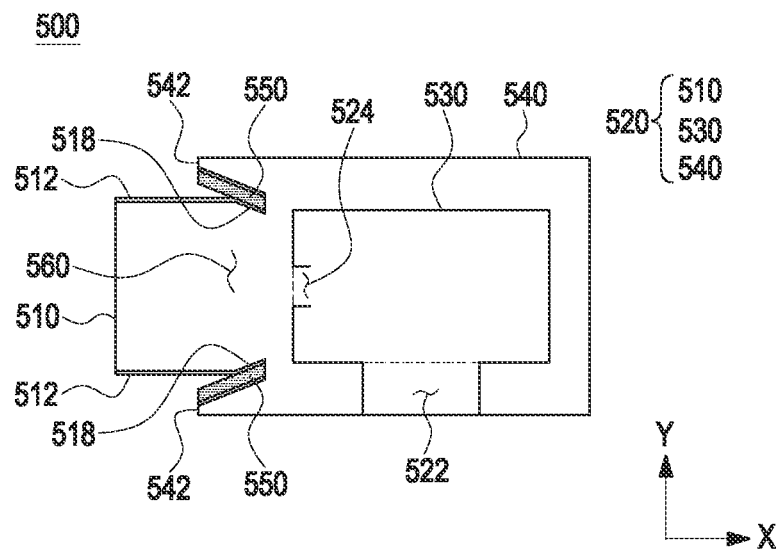
Figure 13B:
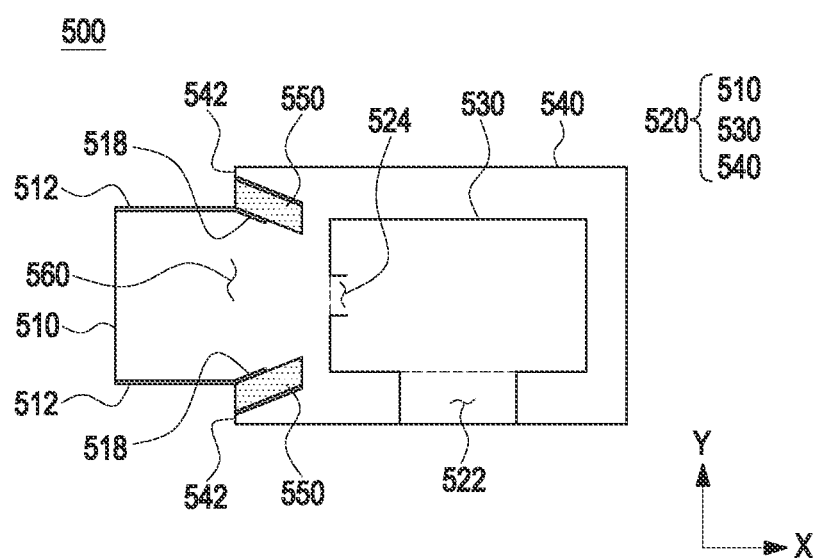
Figure 14A:
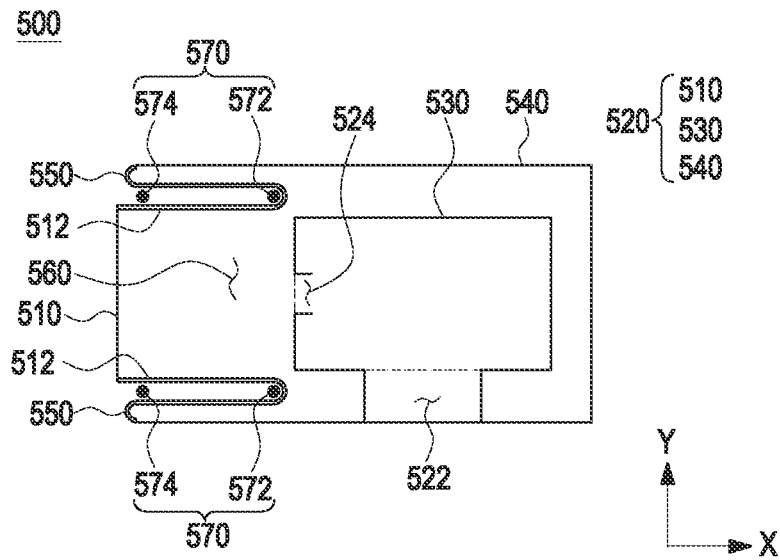
Figure 14B:
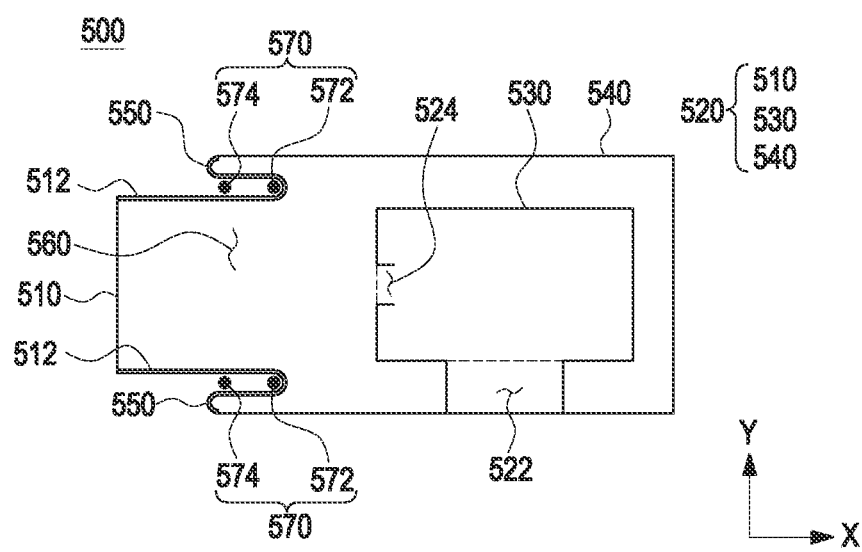
Figure 15A:
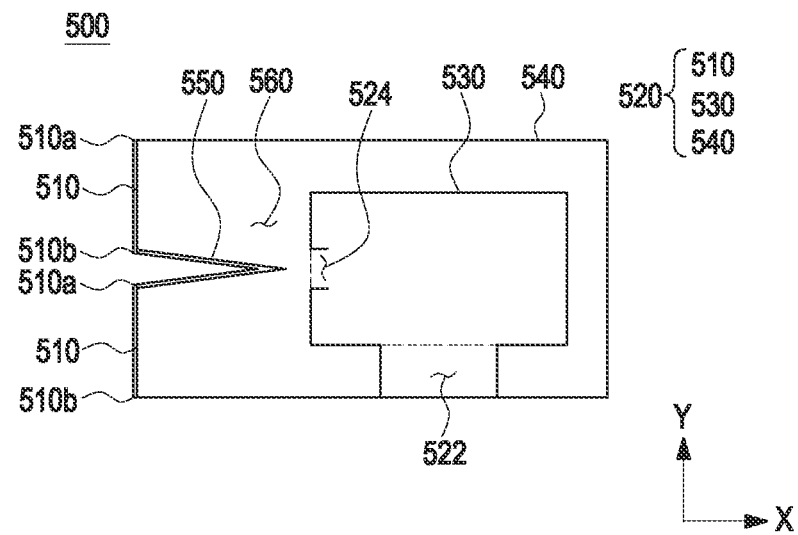
Figure 15B:
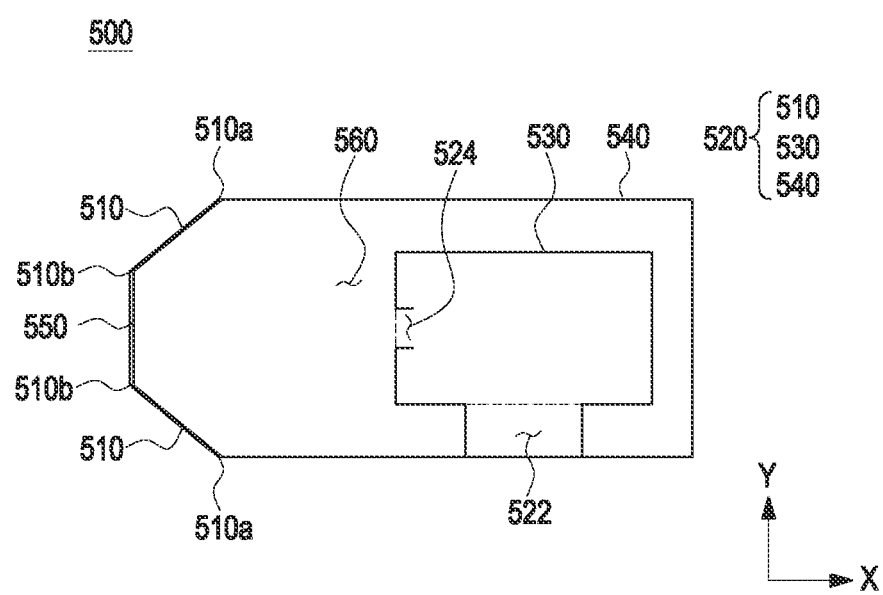
Figure 16A:
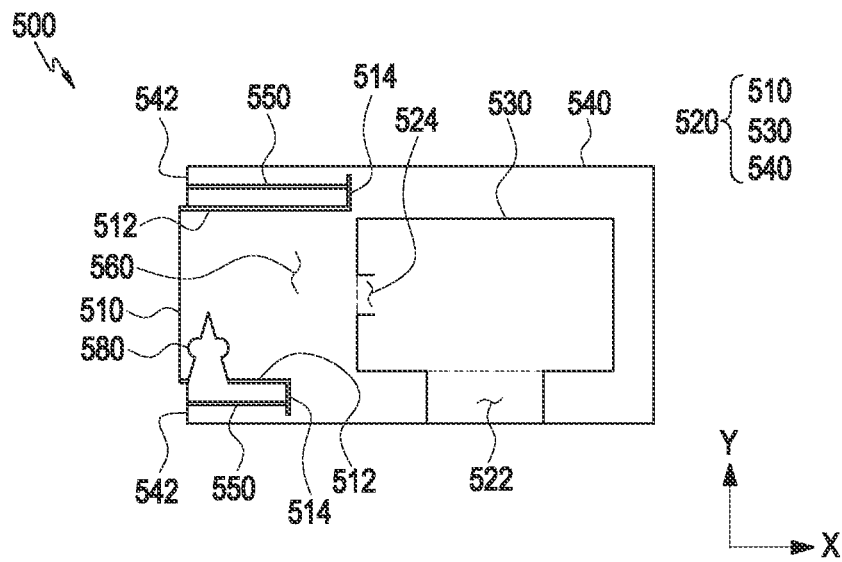
Figure 16B:
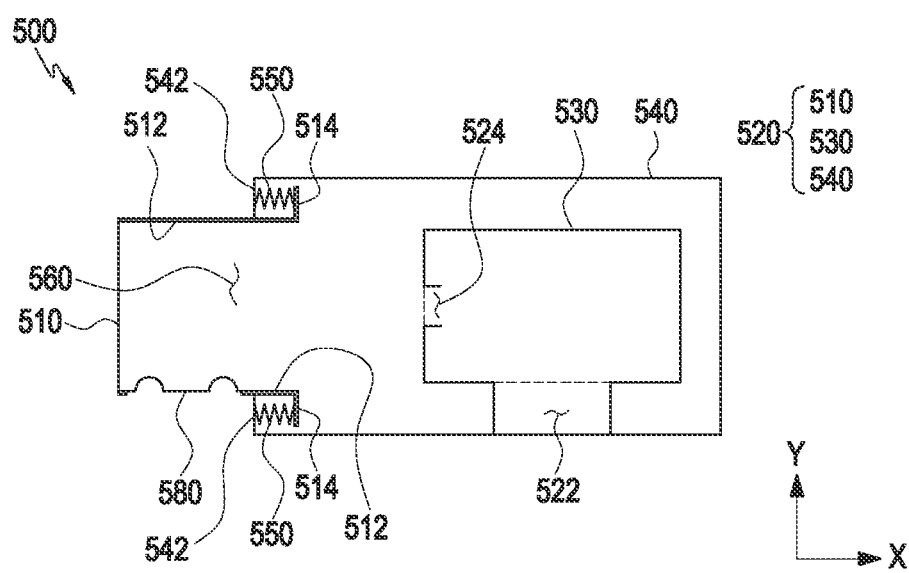
Figure 17A:
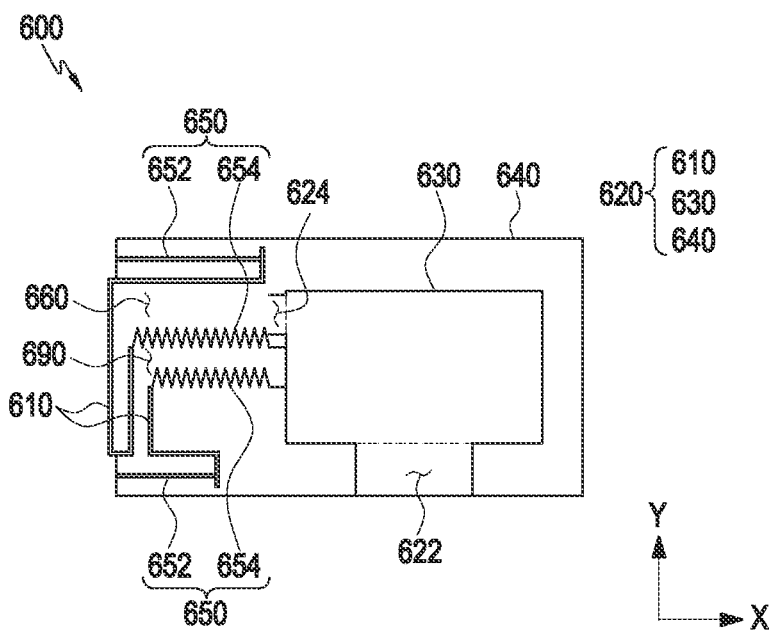
FIGS. 17A, 17B, 18A, and 18B are diagrams illustrating an electronic device including an example reflex port according to various embodiments.
Figure 17B:
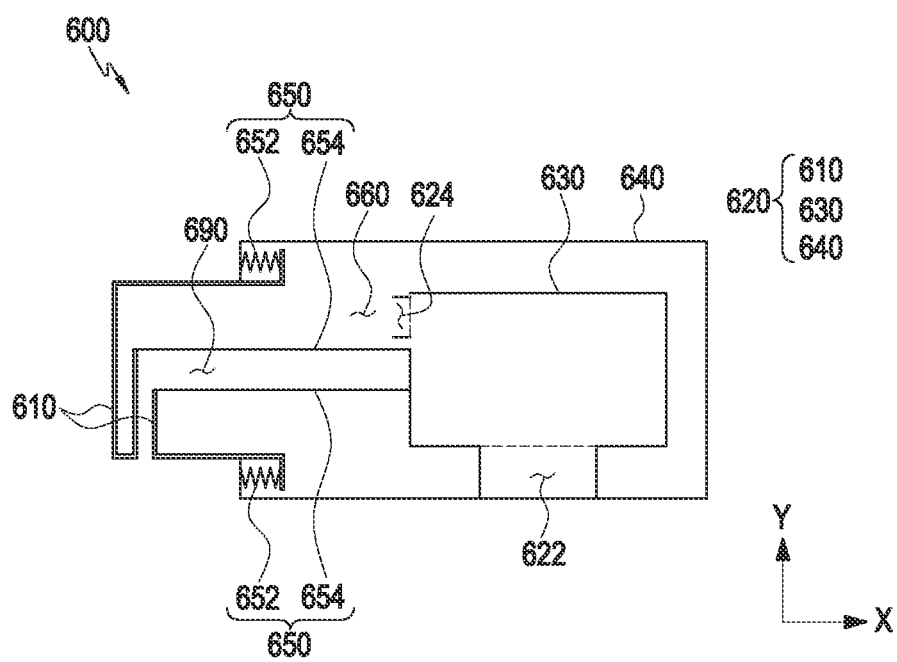
Figure 18A:
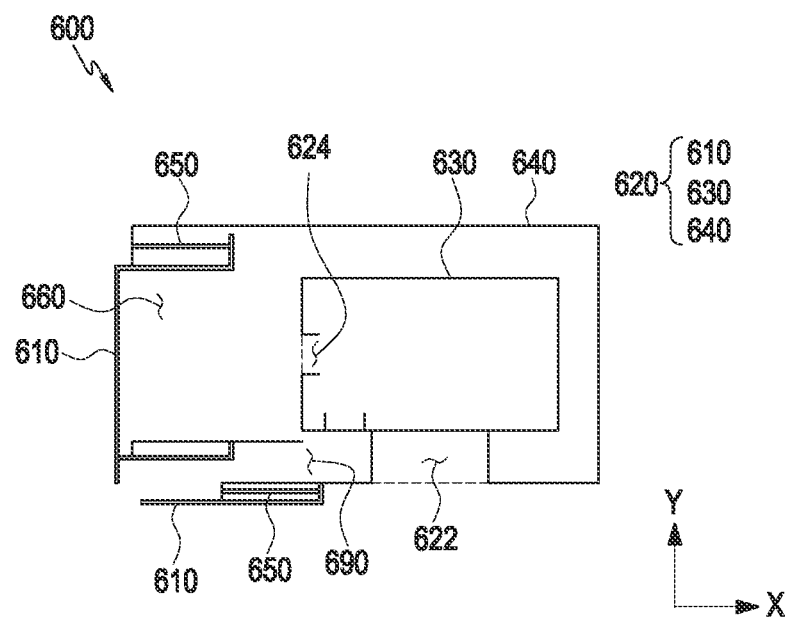
Figure 18B:
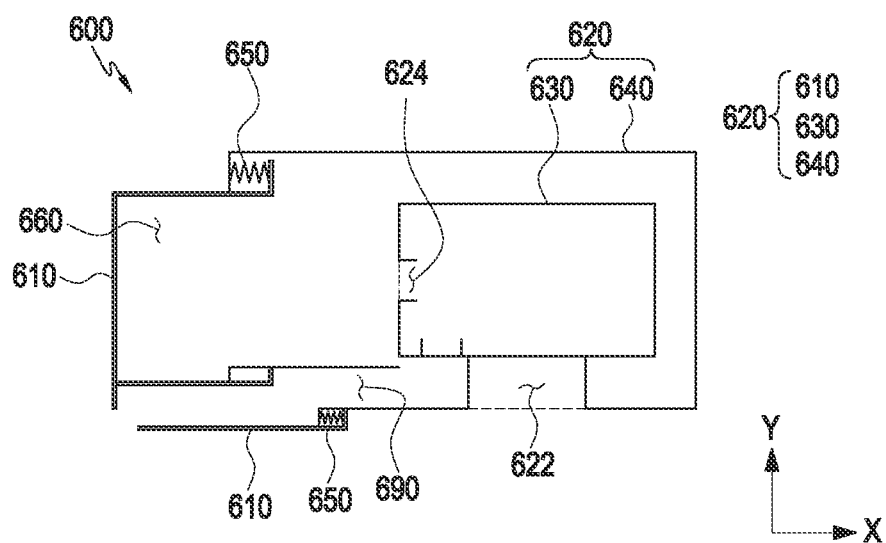

According to various embodiments, the sealing member 550 may be formed of a flexible material. According to an embodiment, the sealing member 550 may include a flexible film. For example, the sealing member 550 may include a film that is movable based on movement of the first housing (e.g., the first housing 310 in FIG. 8A). According to an embodiment (e.g., FIGS. 13A and 13B), the sealing member 550 may include a foam (e.g., a polyurethane foam). According to an embodiment, the sealing member 550 may be disposed between a tilting area 518 extending from the first guide member 512 and the second guide member 542. The sealing member 550 may be compressed or stretched, based on the sliding movement of the first housing (e.g., the first housing 310 in FIG. 7A).

According to various embodiments (e.g., FIGS. 14A and 14B), the electronic device 500 may include a magnetic body 570. According to an embodiment, the magnetic body 570 may include a first magnetic body 572 disposed in the first housing (e.g., the first housing 310 in FIG. 7A) and a second magnetic body 574 facing the first magnetic body 572 and disposed in the second housing (e.g., the second housing 320 in FIG. 7A). For example, the first magnetic body 572 may move based on the movement of the first housing 310 or the first speaker enclosure 510, and the second magnetic body 574 may be coupled to the second housing 320 so as not to move relative to the speaker unit 530. According to an embodiment, the magnetic body 570 may guide the movement of the sealing member 550. The sealing member 550 may move along the first magnetic body 572, and detorsion or tangle of the sealing member 550 may be reduced or prevented. According to an embodiment, the first magnetic body 572 may be disposed such that an attractive force is produced with respect to the second magnetic body 574. For example, when the electronic device 500 is in the opened state (e.g., FIG. 14B), the first magnetic body 572 may face the second magnetic body 574, and the electronic device 500 may remain in the opened state, based on an attractive force generated between the first magnetic body 572 and the second magnetic body 574. According to an embodiment, the first magnetic body 572 may be positioned between the second magnetic body 574 and the speaker unit 530.

According to various embodiments (e.g., FIGS. 15A and 15B), the sealing member 550 may be connected with the first speaker enclosure 510 or the first housing (e.g., the first housing 310 in FIG. 7A), and may be connected to the second speaker enclosure 540 through the first speaker enclosure 510. According to an embodiment, the sealing member 550 may be spaced apart from the second speaker enclosure 540. According to an embodiment, the first speaker enclosure 510 or the first housing 310 may include a first end 510a connected to the second speaker enclosure 540 and a second end 510b connected to the sealing member 550, and the position of a portion of the sealing member 550 and the first speaker enclosure 510 may change according to the sliding movement of the first housing (e.g., the first housing 310 in FIG. 7A). For example, when the electronic device 500 is in the closed state (e.g., FIG. 15A), the first speaker enclosure 510 may be positioned to be perpendicular to the second speaker enclosure 540, and the sealing member 550 may be positioned in a folded state between the first speaker enclosure 510. As another example, when the electronic device 500 is in the opened state (e.g., FIG. 15B), the first speaker enclosure 510 may be positioned to be inclined with the second speaker enclosure 540, and the sealing member 550 may be positioned in an unfolded state between the first speaker enclosure 510.

According to various embodiments (e.g., FIGS. 16A and 16B), the electronic device 500 may include a passive speaker 580 (e.g., passive radiator). According to an embodiment, the passive speaker 580 may include a vibration plate (not shown) configured to vibrate based on pressure within the resonance space 560. According to an embodiment, the passive speaker 580 may be disposed on the first speaker enclosure 510, and may be folded or unfolded based on the sliding movement of the first housing (e.g., the first housing 310 in FIG. 7A). For example, when the electronic device 500 is in the closed state (e.g., FIG. 16A), the passive speaker 580 may be positioned in a folded state inside the electronic device 500, and when the electronic device 500 is in the unfolded state (e.g., FIG. 16B), the passive speaker 580 may be unfolded to be exposed to the outside of the electronic device 500. According to an embodiment, the passive speaker 580 may not include magnets or coils.

According to various embodiments, in the case where the electronic device 500 includes the passive speaker 580, the amplitude of a vibration in a low frequency band (e.g., 200 to 800 Hz), which is generated by the speaker unit 530, may be increased. For example, the electronic device 500 including the passive speaker 580 may generate vibration having an amplitude 1.4 dB greater than the amplitude of a low frequency band of an electronic device that does not include the passive speaker 580.

FIGS. 17A, 17B, 18A, and 18B are diagrams illustrating an electronic device including a reflex port according to various embodiments.

Referring to FIGS. 17A, 17B, 18A, and 18B, an electronic device 600 may include a first speaker enclosure 610, a speaker module 620, a speaker unit 630, a second speaker enclosure 640, and a sealing member (e.g., a seal) 650.

Figure 10A:
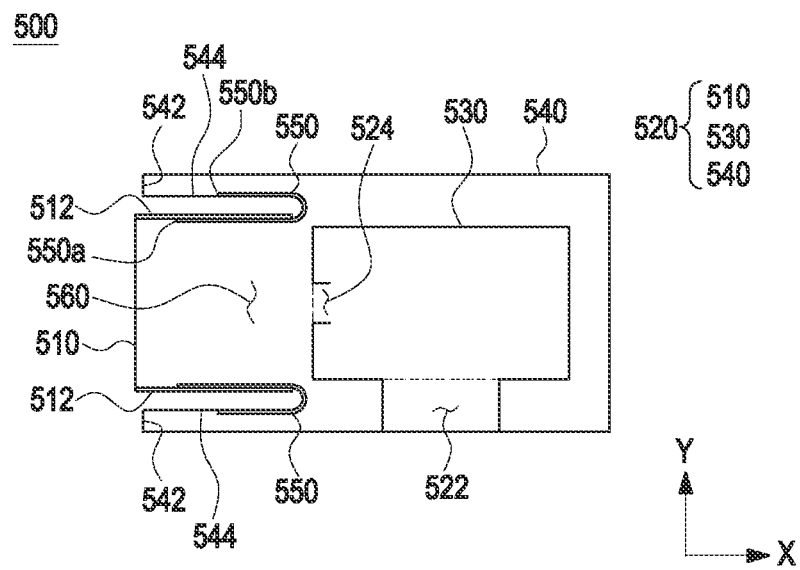
FIGS. 10A, 10B, 11A, 11B, 12A, 12B, 13A, 13B, 14A, 14B, 15A, 15B, 16A, and 16B are diagrams illustrating examples of a first housing and a speaker module according to various embodiments.
Figure 10B:
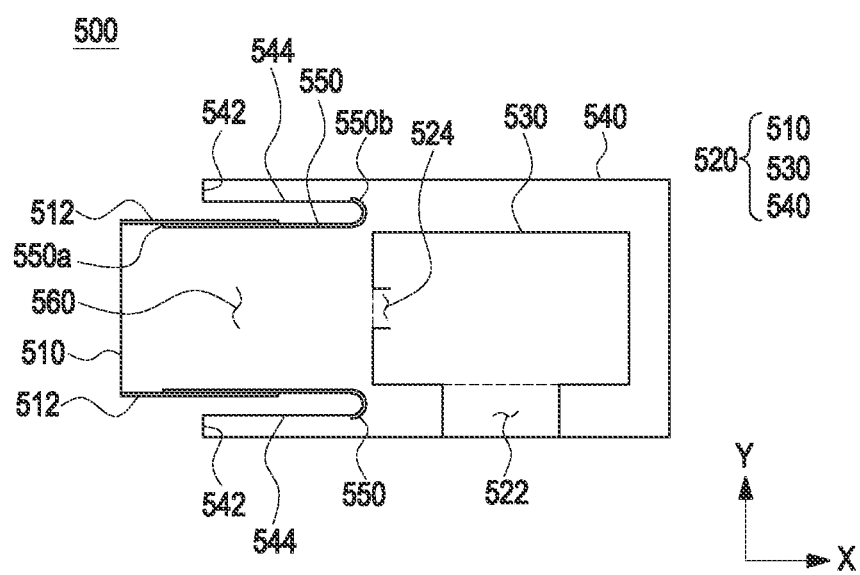
Figure 11A:
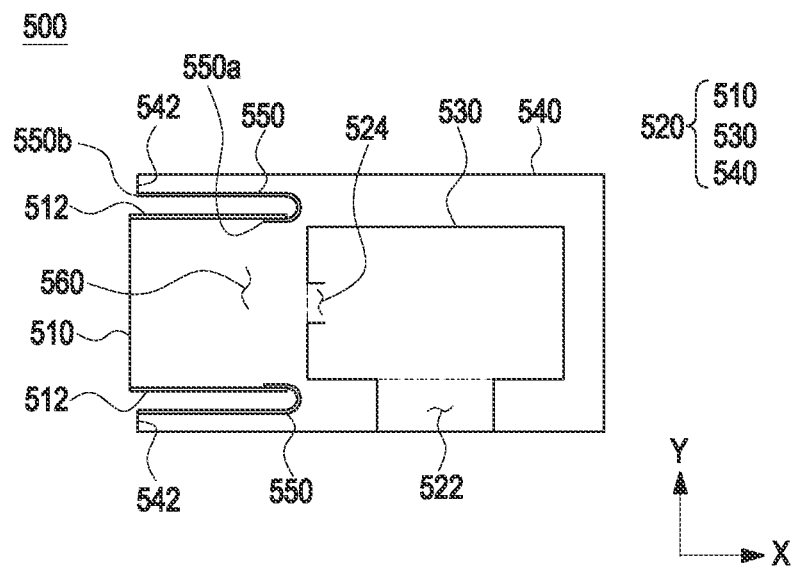
Figure 11B:
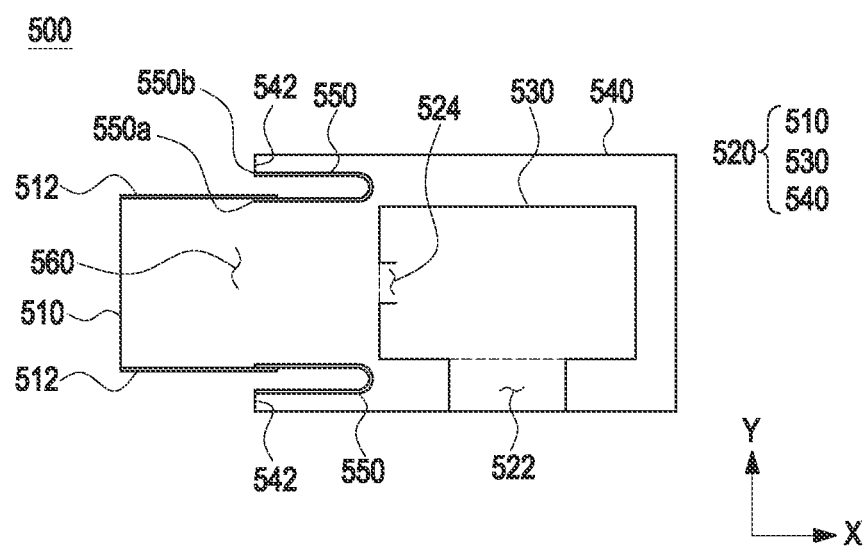

Configurations of the electronic device 600, the first speaker enclosure 610, the speaker module 620, the speaker unit 630, the second speaker enclosure 640 including a resonance hole 624, and the sealing member 650 in FIGS. 17A, 17B, 18A, and 18B may be entirely and partly the same as the configurations of the electronic device 500, the first speaker enclosure 510, the speaker module 520, the speaker unit 530, the second speaker enclosure 540 including the resonance hole 524, and the sealing member 550 in FIG. 10A.

According to various embodiments, the speaker module 620 may be a base reflex type speaker. For example, the speaker module 620 may include a reflex port 690 capable of transmitting vibration of the speaker unit 630 to the outside of the electronic device 600.

According to various embodiments (e.g., FIG. 17A or FIG. 17B), the reflex port 690 may be connected to the outside of the electronic device 600, based on the sliding movement of the first housing (e.g., the first housing 201 in FIG. 3). According to an embodiment (e.g., FIG. 17A), the reflex port 690 may not be exposed to the outside while overlapping the second speaker enclosure 640. For example, when the electronic device 600 is in the closed state (e.g., FIG. 17A), the reflex port 690 may be surrounded by the first speaker enclosure 610, the second speaker enclosure 640, the sealing member 650, and the speaker unit 630. According to an embodiment (e.g., FIG. 17B), the reflex port 690 may be exposed to the outside of the electronic device 600. For example, when the electronic device 600 is in the opened state (e.g., FIG. 17B), a portion of the reflex port 690 may be surrounded by the first speaker enclosure 610, the sealing member 650, and the speaker unit 630, and other portions thereof may be exposed to the outside of the electronic device 600. According to an embodiment, the reflex port 690 may form a sound path between the outside of the electronic device 600 and the speaker unit 630, and amplify a low-pitched sound generated by the speaker unit 630. For example, a low-pitched sound reflected from the inside of the electronic device 600 may be transmitted to the outside of the electronic device 600 through the reflex port 690.

According to various embodiments, the length of the reflex port 690 may change according to the sliding movement of the first housing (e.g., the first housing 201 in FIG. 3). For example, the length of the reflex port 690 in the closed state of the electronic device 600 (e.g., FIG. 18A) may be less than the length of the reflex port 690 in the opened state of the electronic device 600 (e.g., FIG. 18B). According to an embodiment, the loudness of a sound generated by the speaker module 620 may be increased in proportion to the volume or length of the reflex port. For example, as the volume of the reflex port 690 increases, the magnitude of the frequency at which the base peak occurs may be reduced. The base peak may indicate a frequency at which the maximum amplitude of a sound generated by the speaker module 620 is obtained.

According to various embodiments, the sealing member 650 may include a first sealing member 652. According to an embodiment, the first sealing member 652 may be connected to the first speaker enclosure 610 and the second speaker enclosure 640. Configuration of the first sealing member 652 may be entirely or partly the same as the configuration of the sealing member 550 in FIG. 12A.

According to various embodiments, the sealing member 650 may include a second sealing member 654. According to an embodiment, the second sealing member 654 may form at least a portion of the reflex port 690. For example, the second sealing member 654 may be connected to one surface of the speaker unit 630 and the first speaker enclosure 610.

According to various embodiments, based on the sliding movement of the first housing of the electronic device 600 (e.g., the first housing 310 in FIG. 8A), the sealing member 650 may be compressed (or folded) or stretched (or unfolded). According to an embodiment, the compression direction of the first sealing member 652 and the compression direction of the second sealing member 654, based on the sliding movement of the first housing 310, may be different. For example, when the electronic device 600 is in the closed state (e.g., FIG. 17A), the first sealing member 652 may be stretched, and the second sealing member 654 may be compressed. When the electronic device 600 is in the opened state (e.g., FIG. 17B), the first sealing member 652 may be compressed, and the second sealing member 654 may be stretched.

Figure 19:
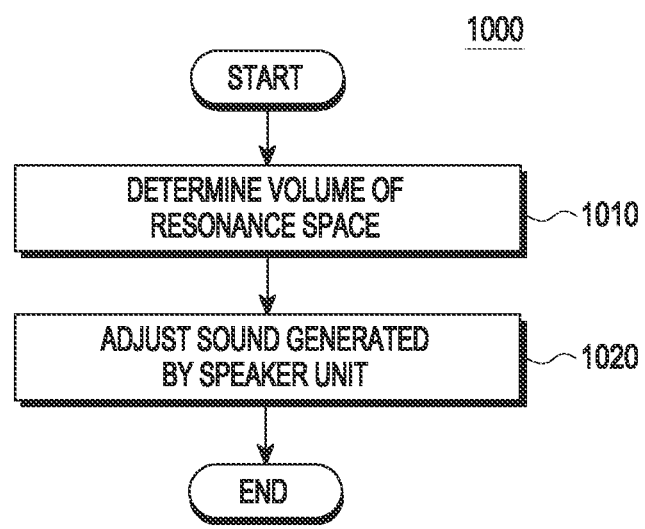
FIG. 19 is a flowchart illustrating an example operation of a speaker module according to various embodiments.

FIG. 19 is a flowchart illustrating an example operation of a speaker module, based on the state of electronic device according to various embodiments.

Referring to FIG. 19, an operation 1000 of adjusting an output of a speaker module (e.g., the speaker module 260 in FIG. 4) of an electronic device (e.g., the electronic device 200 in FIG. 2) may include an operation 1010 of determining the volume of a resonance space (e.g., the resonance space 560 in FIG. 10A or 10B) and an operation 1020 of adjusting a sound generated by the speaker unit (e.g., the speaker unit 530 in FIG. 10A).

According to various embodiments, the electronic device 200 may determine the volume of the resonance space 560. According to an embodiment, a processor (e.g., the processor 120 in FIG. 1) of the electronic device 200 may determine the state of the electronic device 200 or the degree of opening of the electronic device 200, and determine the volume of the resonance space 560, based on the degree of opening of the electronic device 200. For example, the processor 120 may determine whether the electronic device 200 is in a closed state (e.g., FIG. 2), in an opened state (e.g., FIG. 3), or in an intermediate state (e.g., the state between the closed state and the opened state), and determine the volume of the resonance space 560, based on the determined state of the electronic device 200 or the degree of opening of the electronic device 200.

According to various embodiments, the electronic device 200 may include a first magnetic body (e.g., the first magnetic body 572 in FIG. 14A) disposed inside a first housing (e.g., the first housing 310 in FIG. 7A) and a second magnetic body 574 disposed inside a second housing (e.g., the second housing 320 in FIG. 7B). The electronic device 200 may determine the degree of opening of the electronic device 200 and/or the volume of the resonance space 560 using the magnitude of a magnetic field based on the separation distance between the first magnetic body 572 and the second magnetic body 574.

According to various embodiments, the electronic device 200 may include a contact pin (e.g., a pogo pin) (not shown) configured to change an electrical connection path, based on the sliding movement of the first housing 310. The electronic device 200 may determine the degree of opening of the electronic device 200 and/or the volume of the resonance space 560, based on a resistance value of the changed electrical connection path.

According to various embodiments, the electronic device 200 may optimize the speaker module (e.g., the speaker module 520 in FIG. 10A). For example, the processor 120 may optimize the speaker module 520, based on the determined size of the resonance space 560, degree of opening of the electronic device 200, and/or state of the electronic device 200. For example, the processor 120 may adjust a sound generated by the speaker unit (e.g., the speaker unit 530 in FIG. 10A), based on the determined size of the resonance space 560, degree of opening of the electronic device 200, and/or state of the electronic device 200.

According to various example embodiments of the disclosure, an electronic device (e.g., the electronic device 200 in FIG. 3) may include: a first housing (e.g., the first housing 201 in FIG. 3), a second housing (e.g., the second housing 202 in FIG. 3) accommodating at least a portion of the first housing and configured to guide sliding movement of the first housing, a flexible display (e.g., the display 203 in FIG. 3) including a first display area (e.g., the first display area A1 in FIG. 3) disposed on the first housing and a second display area (e.g., the second display area A2 in FIG. 3) extending from the first display area, a speaker module (e.g., the speaker module 400 in FIG. 9A) including a speaker unit (e.g., the speaker unit 410 in FIG. 9A) including at least one speaker disposed in the second housing and a speaker enclosure (e.g., the speaker enclosure 420 in FIG. 9B) accommodating the speaker unit and including a vent hole (e.g., the vent hole 402 in FIG. 9B), and a seal (e.g., the sealing member 550 in FIG. 10A) connected to the first housing and the speaker enclosure and configured to be variable based on the sliding movement of the first housing.

According to various example embodiments, the speaker module may include an emission hole (e.g., the emission hole 404 in FIG. 9A) configured to transmit vibration generated by the speaker unit to the outside of the electronic device and a resonance hole (e.g., the resonance hole 406 in FIG. 9B) facing the first housing.

According to various example embodiments, the electronic device may further include a resonance space (e.g., the resonance space 362 in FIG. 8B) connected to the resonance hole and surrounded at least in part by the first housing and the speaker enclosure.

According to various example embodiments, the first housing may include a first guide (e.g., the first guide member 512 in FIG. 10A) protruding toward the speaker unit and connected to a first end (e.g., the first end 550a in FIG. 10A) of the seal, and the speaker module may include a second guide (e.g., the second guide member 542 in FIG. 10A) protruding from the speaker enclosure toward the first guide and connected to a second end (e.g., the second end 550b in FIG. 10A) opposite the first end of the seal.

According to various example embodiments, the first housing may include at least one first protrusion area (e.g., the first protrusion area 516 in FIG. 12B) protruding from the first guide toward the speaker enclosure, and the speaker enclosure may include at least one second protrusion area (e.g., the second protrusion area 546 in FIG. 12B) protruding toward the first guide.

According to various example embodiments, the speaker enclosure may include a first speaker enclosure (e.g., the first speaker enclosure 510 in FIG. 10A) disposed inside the first housing and a second speaker enclosure (e.g., the second speaker enclosure 540 in FIG. 10A) connected to the first speaker enclosure through the seal and disposed inside the second housing.

The electronic device may further include: a reflex port (e.g., the reflex port 690 in FIG. 17A) configured to transmit vibration of the speaker unit to an outside of the electronic device, and the reflex port may be configured to have a length changing based on the sliding movement of the first housing.

According to various example embodiments, the seal may include a first seal (e.g., the first sealing member 652 in FIG. 17A) connected to the first speaker enclosure and the second speaker enclosure, and a second seal (e.g., the second sealing member 654 in FIG. 17A) connected to the first speaker enclosure and the speaker unit, and configured to form at least a portion of the reflex port.

According to various example embodiments, a compression direction of the first seal and a compression direction of the second seal, may be different based on the sliding movement of the first housing.

According to various example embodiments, the electronic device may further include: a first magnetic body (e.g., the first magnetic body 572 in FIG. 14A) disposed inside the first housing and configured to guide the seal, and a second magnetic body (e.g., the second magnetic body 574 in FIG. 14A) facing the first magnetic body and disposed inside the second housing.

According to various example embodiments, the electronic device may further include: a passive speaker (e.g., the passive speaker 580 in FIG. 16A) disposed on the first housing and configured to be folded or unfolded, based on sliding movement of the first housing.

According to various example embodiments, the first housing may include a first plate (e.g., the first plate 211 in FIG. 4) configured to support the first display area, and the electronic device may further include a roller rotatably mounted to one edge of the first plate and configured to guide rotation of the second display area.

According to various example embodiments, the first plate may include a first plate surface (e.g., the first plate surface 311a in FIG. 7B) facing at least one of the roller or the speaker module, and the seal may be connected to the first plate surface.

According to various example embodiments, the seal may include a film or foam in the shape of a closed curve.

According to various example embodiments, the electronic device may further include: a processor (e.g., the processor 120 in FIG. 1) configured to adjust a signal generated by the speaker unit, based on the sliding movement of the first housing.

According to various example embodiments of the disclosure, an electronic device (e.g., the electronic device 200 in FIG. 3) may include: a first housing (e.g., the first housing 201 in FIG. 3), a second housing (e.g., the second housing 202 in FIG. 3) accommodating at least a portion of the first housing and configured to guide sliding movement of the first housing, a flexible display including a first display area (e.g., the first display area A1 in FIG. 3) disposed on the first housing and a second display area (e.g., the second display area A2 in FIG. 3) extending from the first display area, a speaker module (e.g., the speaker module 400 in FIG. 9A) including a speaker unit including at least one speaker (e.g., the speaker unit 410 in FIG. 9A) disposed in the second housing, a first speaker enclosure (e.g., the first speaker enclosure 510 in FIG. 10A) disposed inside the first housing, and a second speaker enclosure (e.g., the second speaker enclosure 540 in FIG. 10A) disposed inside the second housing and including a speaker enclosure (e.g., the speaker enclosure 420 in FIG. 9A) accommodating the speaker unit, and a seal (e.g., the sealing member 550 in FIG. 10A) connected to the first speaker enclosure and the second speaker enclosure.

According to various example embodiments, the speaker module may include an emission hole (e.g., the emission hole 404 in FIG. 9A) configured to transmit vibration generated by the speaker unit to an outside of the electronic device and a resonance hole (e.g., the resonance hole 406 in FIG. 9B) facing the first speaker enclosure, and the electronic device may further include: a resonance space (e.g., the resonance space 560 in FIG. 10A) connected to the resonance hole and surrounded at least in part by the first speaker enclosure, the second speaker enclosure, and the seal.

According to various example embodiments, the first speaker enclosure may include a first guide (e.g., the first guide member 512 in FIG. 10A) protruding toward the speaker unit and connected to a first end (e.g., the first end 550a in FIG. 10A) of the seal, and the second speaker enclosure may include a second guide (e.g., the second guide member 542 in FIG. 10A) protruding toward the first guide and connected to a second end (e.g., the second end 550b in FIG. 10A) opposite the first end of the seal.

According to various example embodiments, the first speaker enclosure may include at least one first protrusion area (e.g., the first protrusion area 516 in FIG. 12B) protruding from the first guide toward the second speaker enclosure, and the second speaker enclosure may include at least one second protrusion area (e.g., the second protrusion area 546 in FIG. 12B) protruding toward the first guide.

According to various example embodiments, the electronic device may further include: a reflex port (e.g., the reflex port 690 in FIG. 17A) configured to transmit vibration of the speaker unit to an outside of the electronic device, and the reflex port may be configured to have a length changing based on the sliding movement of the first housing.

The electronic device including the various speaker modules of the disclosure described above is not limited to the above-described embodiments and drawings, and it will be clear to those skilled in the art to which the disclosure pertains that various substitutions, modifications, and changes are possible without departing from the technical scope of the disclosure.

What is claimed is:

1. An electronic device comprising:
    a first housing;
    a second housing accommodating at least a portion of the first housing and configured to guide sliding movement of the first housing;
    a flexible display comprising a first display area disposed on the first housing and a second display area extending from the first display area;
    a speaker module comprising a speaker unit including at least one speaker disposed in the second housing, and a speaker enclosure accommodating the speaker unit and comprising a vent hole;
    a seal connected to the first housing and the speaker enclosure and configured to be variable based on the sliding movement of the first housing; and
    a resonance space configured to resonate a vibration generated in the speaker module, and surrounded at least in part by the first housing, the speaker enclosure, and the seal,
    wherein a volume of the resonance space is changeable based on the sliding movement of the first housing.

2. The electronic device of claim 1, wherein the speaker module comprises an emission hole configured to transmit vibration generated by the speaker unit to an outside of the electronic device and a resonance hole facing the first housing.

3. The electronic device of claim 2, wherein the resonance space is connected to the resonance hole.

4. The electronic device of claim 1, wherein the first housing comprises a first guide protruding toward the speaker unit and connected to a first end of the seal, and
    wherein the speaker module comprises a second guide protruding from the speaker enclosure toward the first guide and connected to a second end opposite the first end of the seal.

5. The electronic device of claim 4, wherein the first housing comprises at least one first protrusion area protruding from the first guide toward the speaker enclosure, and
    wherein the speaker enclosure comprises at least one second protrusion area protruding toward the first guide.

6. The electronic device of claim 1, wherein the speaker enclosure comprises a first speaker enclosure disposed inside the first housing, and a second speaker enclosure connected to the first speaker enclosure through the seal and disposed inside the second housing.

7. The electronic device of claim 6, wherein the electronic device further comprises a reflex port configured to transmit vibration of the speaker unit to the outside of the electronic device, and wherein the reflex port is configured to have a length changing based on sliding movement of the first housing.

8. The electronic device of claim 7, wherein the seal comprises a first seal connected to the first speaker enclosure and the second speaker enclosure, and a second seal connected to the first speaker enclosure and the speaker unit, and configured to form at least a portion of the reflex port.

9. The electronic device of claim 8, wherein a compression direction of the first seal and a compression direction of the second seal, are different based on the sliding movement of the first housing.

10. The electronic device of claim 1, further comprising a first magnetic body disposed inside the first housing and configured to guide the seal, and a second magnetic body facing the first magnetic body and disposed inside the second housing.

11. The electronic device of claim 1, wherein the electronic device further comprises a passive speaker disposed on the first housing and configured to be folded or unfolded, based on sliding movement of the first housing.

12. The electronic device of claim 1, wherein the first housing comprises a first plate configured to support the first display area, and wherein the electronic device further comprises a roller rotatably mounted to one edge of the first plate and configured to guide rotation of the second display area.

13. The electronic device of claim 12, wherein the first plate comprises a first plate surface facing at least one of the roller or the speaker module, and wherein the seal is connected to the first plate surface.

14. The electronic device of claim 1, wherein the seal comprises a film or foam in the shape of a closed curve.

15. The electronic device of claim 1, wherein the electronic device further comprises a processor configured to adjust a signal generated by the speaker unit based on the sliding movement of the first housing.

* * * * *